US011493815B2

United States Patent
Yoshida

(10) Patent No.: US 11,493,815 B2
(45) Date of Patent: Nov. 8, 2022

(54) DISPLAY DEVICE

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/243,652

(22) Filed: Apr. 29, 2021

(65) Prior Publication Data
US 2021/0356830 A1 Nov. 18, 2021

Related U.S. Application Data

(60) Provisional application No. 63/026,173, filed on May 18, 2020.

(51) Int. Cl.
G02F 1/1362 (2006.01)
G02F 1/1368 (2006.01)

(52) U.S. Cl.
CPC ...... *G02F 1/136286* (2013.01); *G02F 1/1368* (2013.01)

(58) Field of Classification Search
CPC .................................................. G02F 1/1303
See application file for complete search history.

(56) References Cited

U.S. PATENT DOCUMENTS

2015/0092136 A1* 4/2015 Kim .................. G02F 1/134363
438/30
2017/0123285 A1* 5/2017 Suzuki ................ G09G 3/3688

FOREIGN PATENT DOCUMENTS

JP 2017-083760 A 5/2017

* cited by examiner

*Primary Examiner* — Sang V Nguyen
(74) *Attorney, Agent, or Firm* — Keating & Bennett, LLP

(57) ABSTRACT

A display device includes a plurality of pixel electrodes disposed so that the numbers of pixel electrodes arranged in a column-wise direction vary according to locations in a row-wise direction, a plurality of image lines having lengths corresponding to the numbers of pixel electrodes arranged in the column-wise direction, a common electrode partially disposed in an area outside the display area, a common wire supplies a common potential signal to the common electrode, a plurality of image lead wires drawn from the plurality of image lines into the area outside the display area and disposed to intersect the common wire, and a plurality of capacitance forming sections connected to the plurality of image lead wires in the area outside the display area and disposed to overlap at least either the common electrode or the common wire via at least either of insulating films.

14 Claims, 20 Drawing Sheets

DISPLAY DEVICE

CROSS-REFERENCE TO RELATED APPLICATION

The present application claims priority from Provisional Application No. 63/026,173, the content to which is hereby incorporated by reference into this application.

BACKGROUND OF THE INVENTION

1. Field of the Invention

The technology disclosed herein relates to a display device.

2. Description of the Related Art

A known example of a conventional liquid crystal display device is described in Japanese Unexamined Patent Application Publication No. 2017-83760. The liquid crystal display device described in Japanese Unexamined Patent Application Publication No. 2017-83760 is a liquid crystal display device whose display area is not rectangular in outer shape, and is characterized in that a driver that supplies a video signal is disposed outside the display area, a selector having a selector TFT is present between the display area and the driver, a video signal line is present between the driver and the selector, the drain line is present between the selector and the display area, a scanning circuit that supplies a scanning signal to the scanning line is present outside the display area, the selector is present between the scanning line and the display area, the selector is covered with ITO serving as a common electrode, and a common bus line is disposed outside the selector.

SUMMARY OF THE INVENTION

The liquid crystal display device described in Japanese Unexamined Patent Application Publication No. 2017-83760 makes it possible to place a selector and reduce a frame area, although the display area is not rectangular. However, in a liquid crystal display device whose display area is not rectangular in outer shape, there are differences in length among a plurality of video signal lines, so that there are also differences among parasitic capacitances that are formed separately between each of the video signal lines and a common electrode. For this reason, for example, even when the plurality of video signal lines are supplied with video signals of the same potential, there occur differences in potential among a plurality of pixel electrodes due to differences among parasitic capacitances that are formed between the plurality of video signal lines and the common electrode, so that the differences may be viewed as display unevenness.

The technology described herein was made in view of such circumstances, and has as an object to reduce deterioration in display quality due to differences among loads.

(1) According to the technology described herein, a display device includes a plurality of pixel electrodes arranged in a row-wise direction and a column-wise direction and disposed so that the numbers of the pixel electrodes arranged in the column-wise direction vary according to locations in the row-wise direction, a plurality of image lines extending along the column-wise direction and supplying an image signal to the plurality of pixel electrodes arranged in the column-wise direction, the plurality of image lines being arranged in the row-wise direction and having lengths corresponding to the numbers of the pixel electrodes arranged in the column-wise direction, a display area in which at least the plurality of image lines and the plurality of pixel electrodes are disposed, a common electrode disposed in the display area to overlap the plurality of pixel electrodes via an insulating film and partially disposed in an area outside the display area, a common wire, disposed in the area outside the display area, that supplies a common potential signal to the common electrode, a plurality of image lead wires drawn from the plurality of image lines into the area outside the display area and disposed to intersect the common wire via an insulating film, and a plurality of capacitance forming sections connected to the plurality of image lead wires in the area outside the display area and disposed to overlap at least either the common electrode or the common wire via an insulating film.

(2) Further, in the display device, in addition to (1) described above, the capacitance forming sections may include a plurality of common wire capacitance forming sections joined to the plurality of image lead wires and disposed to overlap the common wire via an insulating film.

(3) Further, in addition to (2) described above, the display device may further include a plurality of scanning lines disposed to extend along the row-wise direction in the display area and intersect the image lines via an insulating film and arranged in the column-wise direction and a plurality of scanning lead wires drawn from the scanning lines into the area outside the display area and disposed to intersect the plurality of image lead wires via an insulating film, and the capacitance forming sections may include a plurality of scanning lead wire capacitance forming sections joined to at least either the plurality of image lead wires or the plurality of common wire capacitance forming sections and disposed to overlap the scanning lead wires via an insulating film.

(4) Further, in the display device, in addition to any of (1) to (3) described above, the capacitance forming sections may include a plurality of common electrode capacitance forming sections disposed to overlap the common electrode via an insulating film in the area outside the display area.

(5) Further, in the display device, in addition to (4) described above, the capacitance forming sections may include a plurality of common wire capacitance forming sections joined to the plurality of image lead wires and disposed to overlap the common wire via an insulating film, and the plurality of common electrode capacitance forming sections may be connected to the plurality of common wire capacitance forming sections.

(6) Further, in the display device, in addition to (5) described above, the common electrode capacitance forming sections may include first overlap sections disposed to overlap the common wire capacitance forming sections via an insulating film.

(7) Further, in addition to (6) described above, the display device may further include scanning lines disposed to extend along the row-wise direction in the display area and intersect the image lines via an insulating film and scanning lead wires drawn from the scanning lines into the area outside the display area and disposed to intersect the plurality of image lead wires via an insulating film, and the common electrode capacitance forming sections may have second overlap sections disposed to overlap the scanning lead wires via an insulating film.

(8) Further, in addition to (7) described above, the display device may further include a signal supply unit that supplies a plurality of the image signals in a time-division manner, an image signal supply wire connected to the signal supply unit, and a switch circuit, connected to the image signal supply wire and the plurality of image lead wires, that sorts the plurality of image signals to the plurality of image lines.

(9) Further, in the display device, in addition to (8) described above, the switch circuit may be disposed so that at least the common wire and the scanning lead wires are interposed between the switch circuit and the display area, the common electrode capacitance forming sections may have third overlap sections disposed to overlap, via an insulating film, portions of the image lead wires located closer to the switch circuit than the scanning lead wires, and the common electrode may have an extended common electrode section disposed to overlap the third overlap sections via an insulating film.

(10) Further, in the display device, in addition to any of (6) to (9) described above, the common electrode capacitance forming sections may have extended capacitance forming sections extended to overlap the common wire but not to overlap the common wire capacitance forming sections.

(11) Further, in the display device, in addition to any of (5) to (10) described above, the common electrode capacitance forming sections may include a conducting film which is identical to that which the pixel electrodes include.

(12) Further, in the display device, in addition to (11) described above, the plurality of image lines and the plurality of common wire capacitance forming sections may be disposed at a higher layer than the common wire via an insulating film, the common electrode capacitance forming sections and the pixel electrodes may be disposed at a higher layer than the plurality of image lines and the plurality of common wire capacitance forming sections via an insulating film, and the common electrode may be disposed at a higher layer than the common electrode capacitance forming sections and the pixel electrodes via an insulating film.

(13) Further, in the display device, in addition to (11) described above, the plurality of image lines and the plurality of common wire capacitance forming sections may be disposed at a higher layer than the common wire via an insulating film, the common electrode may be disposed at a higher layer than the plurality of image lines and the common wire capacitance forming sections via an insulating film, and the common electrode capacitance forming sections and the pixel electrodes may be disposed at a higher layer than the common electrode via an insulating film.

(14) Further, in addition to any of (11) to (13) described above, the display device may further include scanning lines disposed to extend along the row-wise direction in the display area and intersect the image lines via an insulating film and scanning lead wires drawn from the scanning lines into the area outside the display area, and the common wire may include main wiring components constituted by a conducting film which is identical to that which the scanning lines and the scanning lead wires are constituted by and disposed to intersect the image lead wires and the common wire capacitance forming sections via an insulating film and scanning lead wire intersections constituted by a conducting film which is identical to that which the image lead wires and the common wire capacitance forming sections are constituted by and disposed to intersect the scanning lead wires via an insulating film.

(15) Further, in the display device, in addition to any of (1) to (14) described above, the plurality of capacitance forming sections may be configured to become smaller in area of overlap with at least either the common electrode or the common wire as the image lines to which the plurality of capacitance forming sections are connected via the image lead wires become larger in length.

Advantageous Effects of Invention

The technology described herein makes it possible to reduce deterioration in display quality due to differences among loads.

DETAILED DESCRIPTION OF THE INVENTION

Embodiment 1

Figure 1:
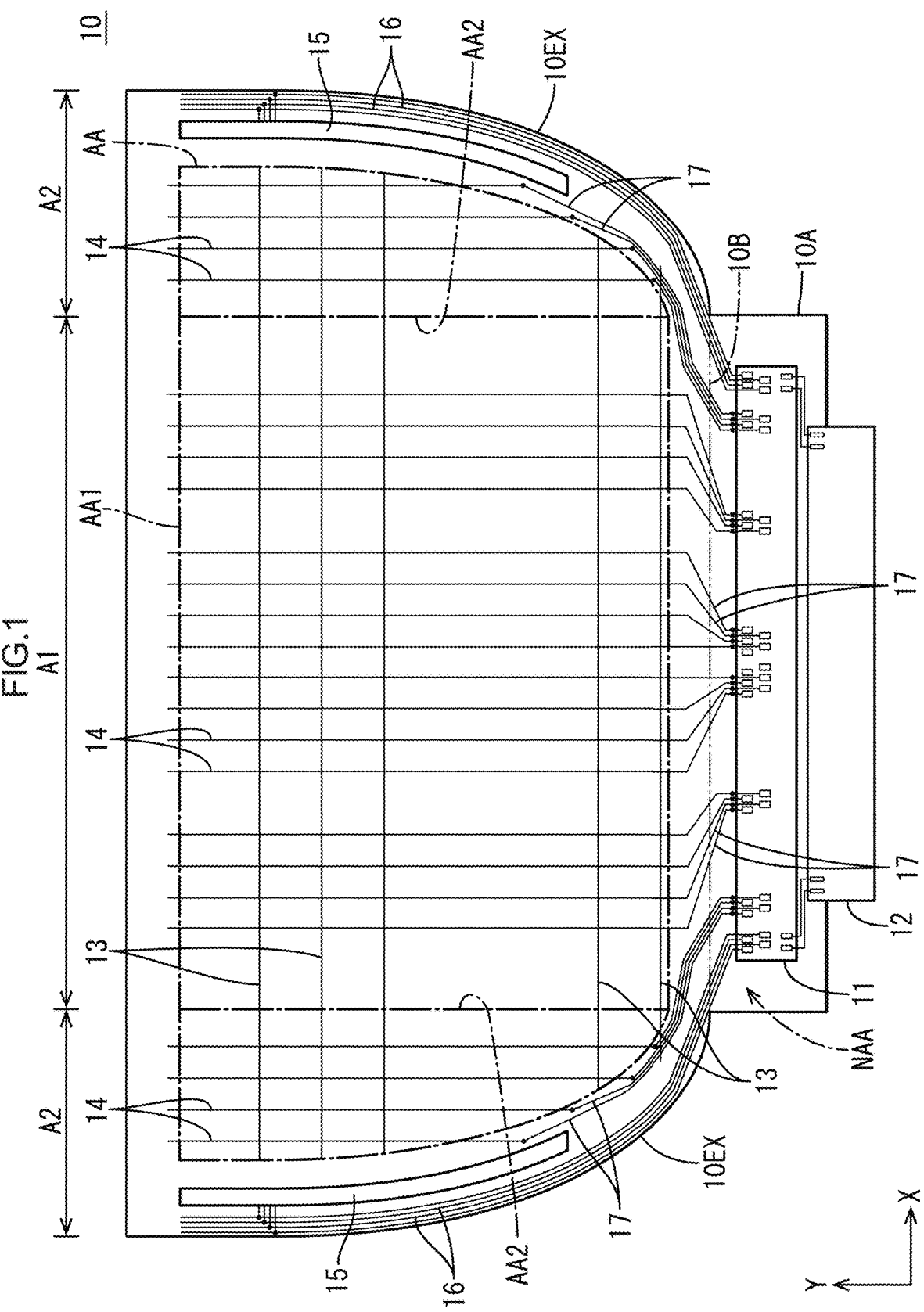
FIG. 1 is a plan view of a liquid crystal panel according to Embodiment 1.

Embodiment 1 is described with reference to FIGS. 1 to 10. The present embodiment illustrates a liquid crystal panel (display device) 10. It should be noted that some of the drawings show an X axis, a Y axis, and a Z axis, and are drawn such that each of the axes extends in a corresponding one of the directions shown in the drawings. Further, FIGS. 4, 5, 6, 9, and 10 show front side up and back side down.

FIG. 1 is a plan view of the liquid crystal panel 10. As shown in FIG. 1, the liquid crystal panel 10, when seen in plan view, has an outer shape that is not a typical square but is an odd shape (non-rectangular shape) including a curved portion (non-linear portion) such as a circular arc as a part of the outer shape. The liquid crystal panel 10 has a horizontally long shape as a whole, and has an extended outer shape section 10EX whose width is extended with distance from the after-mentioned driver (signal supply unit) 11. More specifically, the liquid crystal panel 10 includes a first area (rectangular area) A1 having a horizontally long square shape when seen in plan view and a pair of second areas (non-rectangular areas) A2 each having an extended outer shape section 10EX. Whereas the first area A1 is located at the center in an X-axis direction, the pair of second areas A2 are located at both ends, respectively, of the first area A1 in the X-axis direction so that the first area A1 is interposed between the two second areas A2. The first area A1 projects toward one side (in FIG. 1, a lower side) in a Y-axis direction from the second areas A2, and the projecting portion is mounted with the driver 11 and a flexible substrate 12. The pair of second areas A2 have vertically long shapes when seen in plan view and have such outer shapes that corner parts thereof located toward the driver 11 in the Y-axis direction and outward in the X-axis direction are notched into circular arc shapes, and the circular arc portions serve as the extended outer shape sections 10EX. Each second area A2 is configured such that a dimension (width dimension) thereof in the X-axis direction varies according to position in the Y-axis direction, becomes smaller toward the driver 11, and, conversely, becomes larger away from the driver 11, but a width thereof becomes constant at a certain or longer distance from the driver 11. Further, curvatures of the extended outer shape sections 10EX become larger toward the driver 11 in the Y-axis direction and, conversely, become smaller away from the driver 11.

In the liquid crystal panel 10, as shown in FIG. 1, a portion of a screen located at the center serves a display area AA (i.e. an area surrounded by dot-and-dash lines in FIG. 1) where an image is displayed, and a frame-shaped outer peripheral portion of the screen surrounding the display area AA serves as a non-display area NAA where no image is displayed. In the liquid crystal panel 10, the display area AA is disposed to lie astride the aforementioned first and second areas A1 and A2 and, when seen in plan view, has an odd shape that is similar to the outer shape of the liquid crystal panel 10. That is, the outer shape of the display area AA includes portions of the liquid crystal panel 10 that run parallel to the extended outer shape sections 10EX and, macroscopically, forms a curved line. The display area AA of the liquid crystal panel 10 includes a rectangular display area AA1 similar to the first area A1 and a non-rectangular display area AA2 similar to the second area A2. In the display area AA of the liquid crystal panel 10, a plurality of gate lines (scanning lines) 13 extending along the X-axis direction (row-wise direction) and a plurality of source lines (image lines, data lines) 14 extending along the Y-axis direction (column-wise direction) are arranged in gridlike fashion as a whole. In the liquid crystal panel 10, the non-display area NAA is disposed to lie astride the first and second areas A1 and A2. The non-display area NAA is an area that is present between the display area AA and an outer edge of the liquid crystal panel 10.

As shown in FIG. 1, the liquid crystal panel 10 includes a pair of substrates 10A and 10B bonded together so that a liquid crystal layer is sandwiched therebetween. The pair of substrates 10A and 10B include an array substrate (active matrix substrate, element substrate) 10A facing the back side (backward) and a CF substrate (counter substrate) 10B facing the front side (forward). The array substrate 10A and the CF substrate 10B each include a glass substrate and films of various types stacked over an inner surface of the glass substrate. A polarizing plate is attached to an outer surface of each of the two substrates 10A and 10B. The pair of substrates 10A and 10B of the liquid crystal panel 10 each include the above first and second areas A1 and A2. In the non-display area NAA of the array substrate 10A, a pair of gate circuit sections (scanning circuit sections) 15 are provided on both sides, respectively, of the display area AA in the X-axis direction so that the display area AA is interposed between the two gate circuit sections 15. The gate circuit sections 15 are monolithically provided using various types of film provided in the array substrate 10A, and serve to supply scanning signals to the gate lines 13 provided in the display area AA. The gate circuit sections 15 are connected to all of the gate lines 13 disposed in the display area AA, and are smaller in range of formation in the Y-axis direction than the display area AA. The gate circuit sections 15 are located in the second areas A2 by being disposed between the display area AA and outer edges of the extended outer shape sections 10EX in the non-display area NAA. That is, the gate circuit sections 15 are provided in pair at both ends, respectively, of the display area AA in the X-axis direction so that the display area AA is interposed between the gate circuit sections 15, and are arranged with the display area AA in the same direction as the X-axis direction. The gate circuit sections 15 have outer shapes large portions (i.e. portions excluding upper end portions shown in FIG. 1) of which form circular arc shapes in plan view in such a manner as to run parallel to the extended outer shape sections 10EX. In the non-display area NAA of the array substrate 10A, a gate circuit lead wire (scanning circuit lead wire) 16 is provided to make a trunk connection between a gate circuit section 15 and the flexible substrate 12 and supply a circuit control signal or other signals to the gate circuit section 15.

As shown in FIG. 1, the CF substrate 10B is shorter in short-side dimension than the array substrate 10A, and is bonded to the array substrate 10A in such a manner that a first end (in FIG. 1, an upper end) thereof in a short-side direction (Y-axis direction) meets a first end (in FIG. 1, an upper end) of the array substrate 10A in the short-side direction. Accordingly, a second end (in FIG. 1, a lower end) of the array substrate 10A in the short-side direction projects laterally from the CF substrate 10B. That is, the array substrate 10A has its first area A1 further extended to one side in the Y-axis direction than that of the CF substrate 10B, and the extended portion serves as a mounting area for the driver 11 and the flexible substrate 12. In the mounting area in the array substrate 10A for the driver 11 and the flexible substrate 12, terminal areas are provided that are connected via an anisotropic conductive film to terminals of the driver 11 and the flexible substrate 12. The driver 11 is composed of an LSI chip having a driving circuit inside, is mounted on the array substrate 10A by COG (chip on glass), and processes various types of signal that are transmitted by the flexible substrate 12. In the present embodiment, the driver 11 has a long and thin block shape that extends along the X-axis direction, and one driver 11 is mounted in a substantially middle position on the array substrate 10A in the short-side direction (X-axis direction). Signals that are outputted from the driver 11 include an image signal that is supplied to a source line 14 provided in the display area AA. In the non-display area NAA of the array substrate 10A, an image signal supply wire 17 is provided to make a trunk connection between a source line 14 and the driver 11 and supply an image signal to the source line 14. This source lead wire 17 is routed in such a manner as to spread substantially fanwise from the mounting area for the driver 11 to the vicinity of ends of source lines 14 of the display area AA, and has a first end connected to a terminal area that is connected to a terminal of the driver 11 and a second end (facing the display area AA) connected to the source lines 14 via a switch transistor 36 and source lead wires (image lead wires) 34, which will be described later. The flexible substrate 12 is configured by forming a large number of wiring patterns (not illustrated) over a substrate composed of a synthetic resin material (such as polyimide resin) having insulation properties and flexibility. The flexible substrate 12 has a first end connected to the array substrate 10A and a second end connected to an external control substrate (signal supply source). Various types of signal that are supplied from the control substrate are transmitted to the liquid crystal panel 10 via the flexible substrate 12 and, after being processed by the driver 11, are outputted toward the display area AA.

Figure 2:
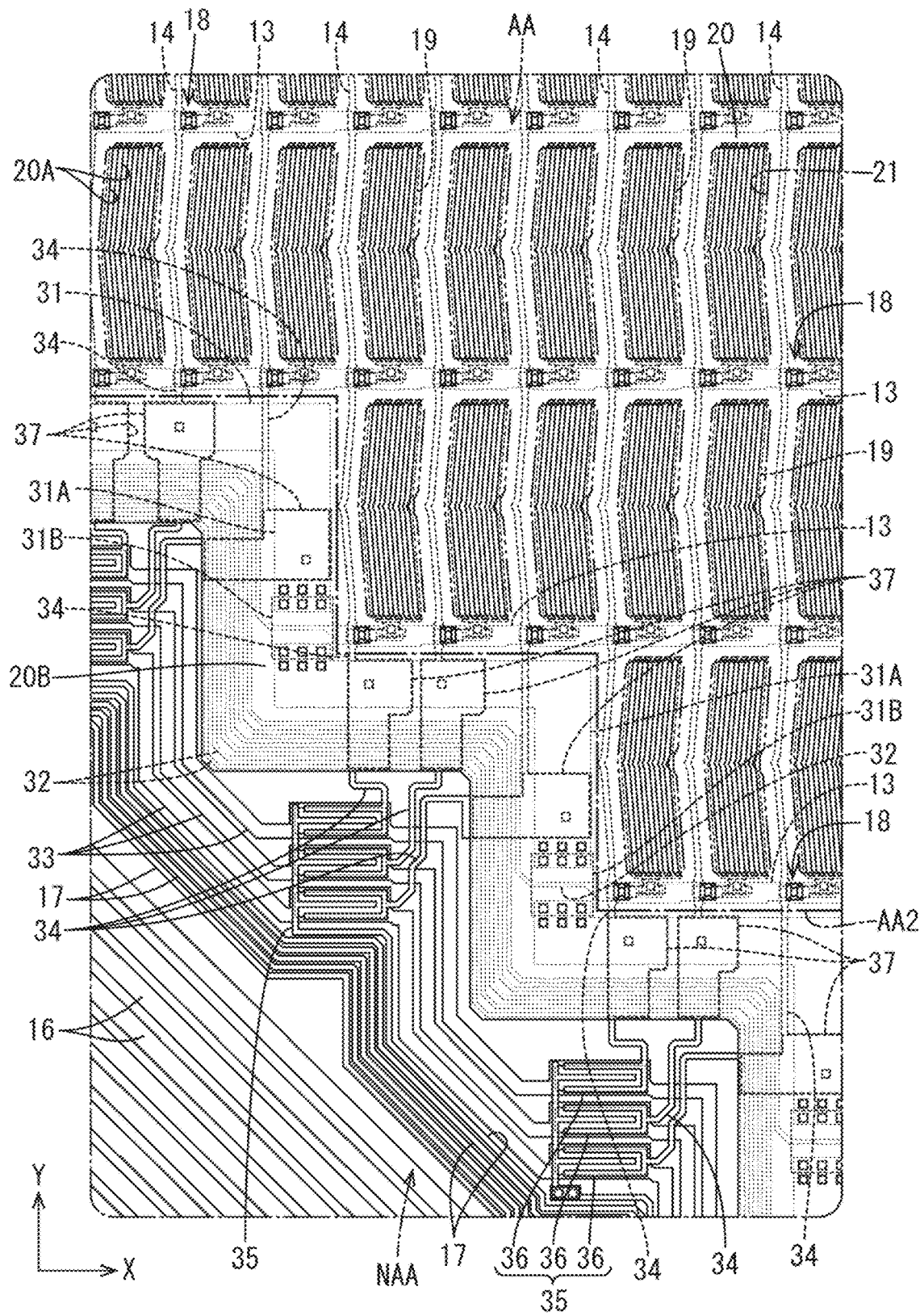
FIG. 2 is a plan view of an array substrate of the liquid crystal panel in and near an extended outer shape section.
Figure 3:
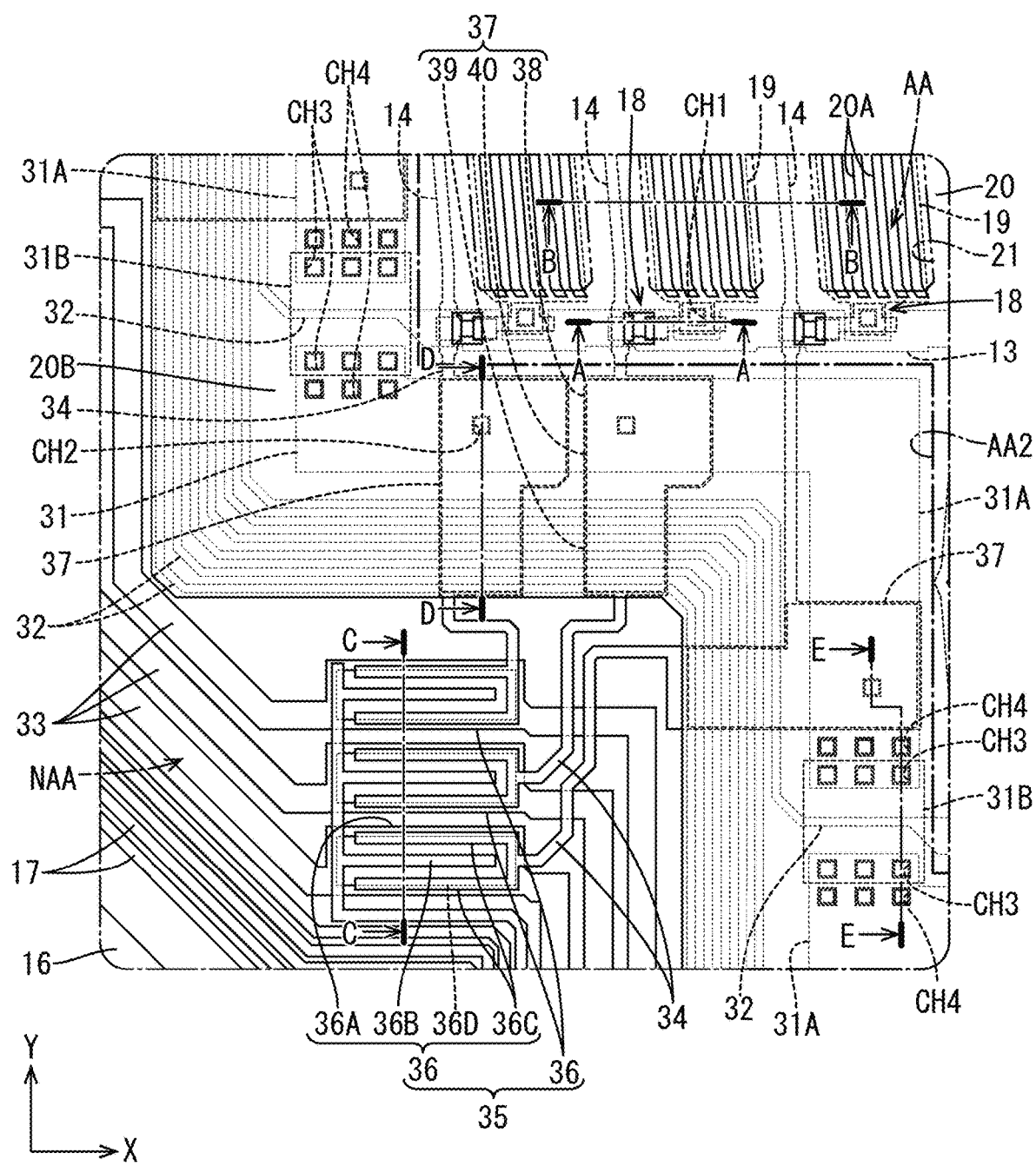
FIG. 3 is a plan view of the array substrate in and near a capacitance wire, source lead wires, and a switch circuit.

Next, a configuration of the display area AA of the array substrate 10A is described as appropriate with reference to FIGS. 2 and 3. FIG. 2 is a plan view of the array substrate 10A in and near an extended outer shape section 10EX. FIG. 3 is an enlarged plan view of a part of FIG. 2 (such as a common wire 31, source lead wires 34, and a switch circuit 35, which will be described later). Over an inner surface of the array substrate 10A in the display area AA, as shown in FIGS. 2 and 3, a pixel transistor 18 and a pixel electrode 19 are provided. A plurality of the pixel transistors 18 and a plurality of the pixel electrodes 19 are arrayed in a matrix (rows and columns) by being placed at spacings along the X-axis direction (row-wise direction) and the Y-axis direction (column-wise direction). Around these pixel transistors 18 and these pixel electrodes 19, the gate lines 13 and the source lines 14, which are substantially orthogonal to (intersect) each other, are disposed. Whereas the gate lines 13 linearly extend along the X-axis direction while changing in line width halfway, the source lines 14 extend substantially along the Y-axis direction while being repeatedly bent in a staggered manner. Each of the gate lines 13 is connected to a plurality of the pixel transistors 18 arranged along the X-axis direction, and a plurality of the gate lines 13 are arranged at spacings in the Y-axis direction. Each of the source lines 14 is connected to a plurality of the pixel transistors 18 arranged along the Y-axis direction, and a plurality of the source lines 14 are arranged at spacings in the X-axis direction. The planar shapes of the pixel electrodes 19 are vertically long substantially square shapes whose long sides are bent along the source lines 14. Long sides of the pixel electrodes 19 are approximately three times as long as short sides of the pixel electrodes 19. A configuration of each of the pixel transistors 18 will be described in detail later.

At a higher layer than the pixel electrodes 19 in the array substrate 10A, as shown in FIGS. 2 and 3, a substantially solid common electrode 20 is formed in such a manner as to overlap the pixel electrodes 19. FIG. 2 uses chain double-dashed lines to illustrate the common electrode 20. The common electrode 20 is supplied with a common potential signal (reference potential signal). A portion of the common electrode 20 overlapping a pixel electrode 19 has bored therethrough a plurality of pixel electrode overlap openings 20A that extend along a direction parallel with the length of the pixel electrode 19. Generation of a potential difference between the pixel electrode 19 and the common electrode 20, which overlap each other, causes a fringe field (oblique field) containing a component normal to a board surface of the array substrate 10A in addition to a component parallel to the board surface of the array substrate 10A to be generated between the pixel electrode 19 and opening edges of the pixel electrode overlap openings 20A of the common electrode 20. Accordingly, utilizing this fringe field makes it possible to control a state of alignment of the liquid crystal molecules contained in the after-mentioned liquid crystal layer. That is, the liquid crystal panel 10 according to the present embodiment operates in an FFS mode (fringe field switching) mode. Further, in the display area AA of the CF substrate 10B, a large number of color filters are arranged in a matrix in places on the side of the array substrate 10A opposite to the respective pixel electrodes 19. The color filters include color filters of three colors, namely R (red), G (green), and B (blue), repeatedly arranged in a predetermined order, and constitute pixels (a red pixel, a green pixel, and a blue pixel) of each color together with the pixel electrodes 19. A display pixel capable of a color display of a predetermined tone is constituted by three pixels, namely a red pixel, a green pixel, and a blue pixel. Further, a light shield (black matrix) 21 for preventing a mixture of colors is formed between each color filter and the other. FIG. 2 uses dot-and-dash lines to illustrate the light shield 21. The planar shape of the light shield 21 is a substantially gridlike shape, and has openings in a place therein overlapping the pixel electrodes 19 when seen in plan view.

Figure 4:
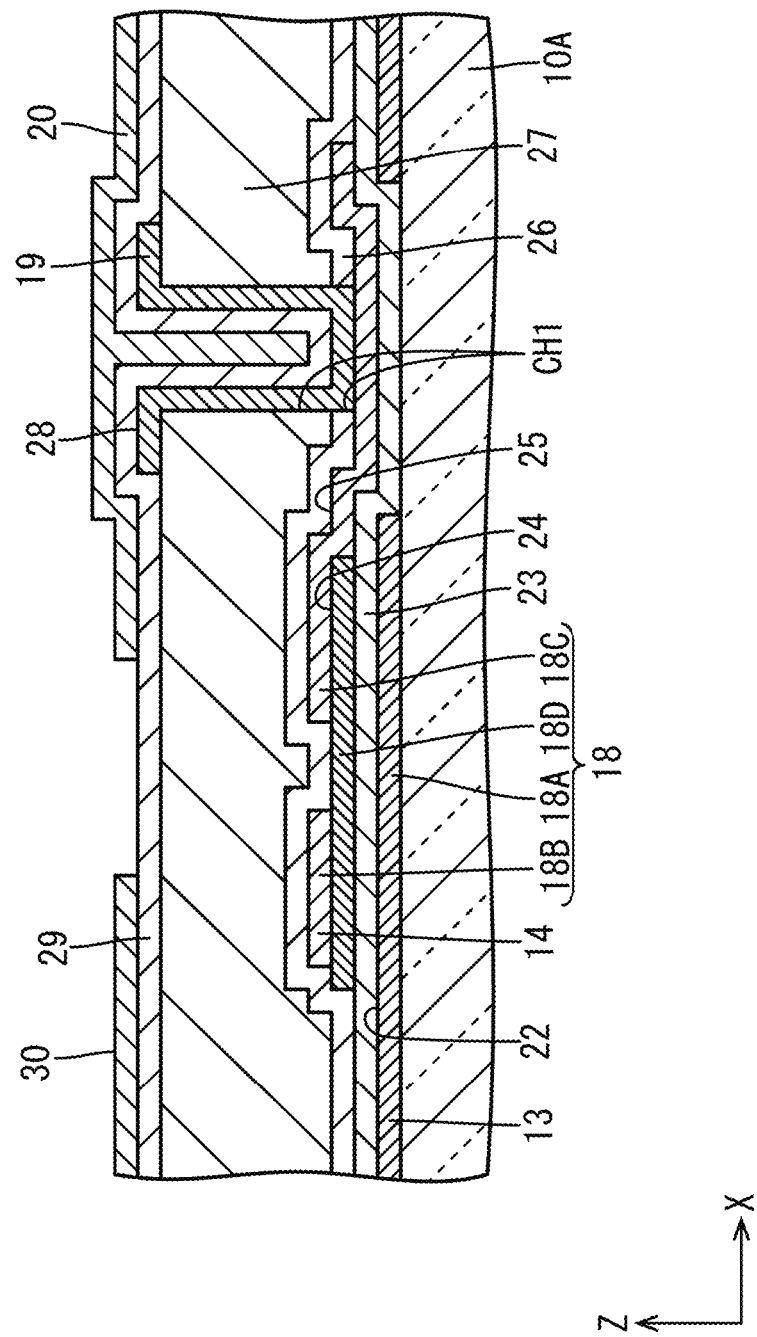
FIG. 4 is a cross-sectional view of the array substrate as taken along line A-A in FIG. 3.
Figure 5:
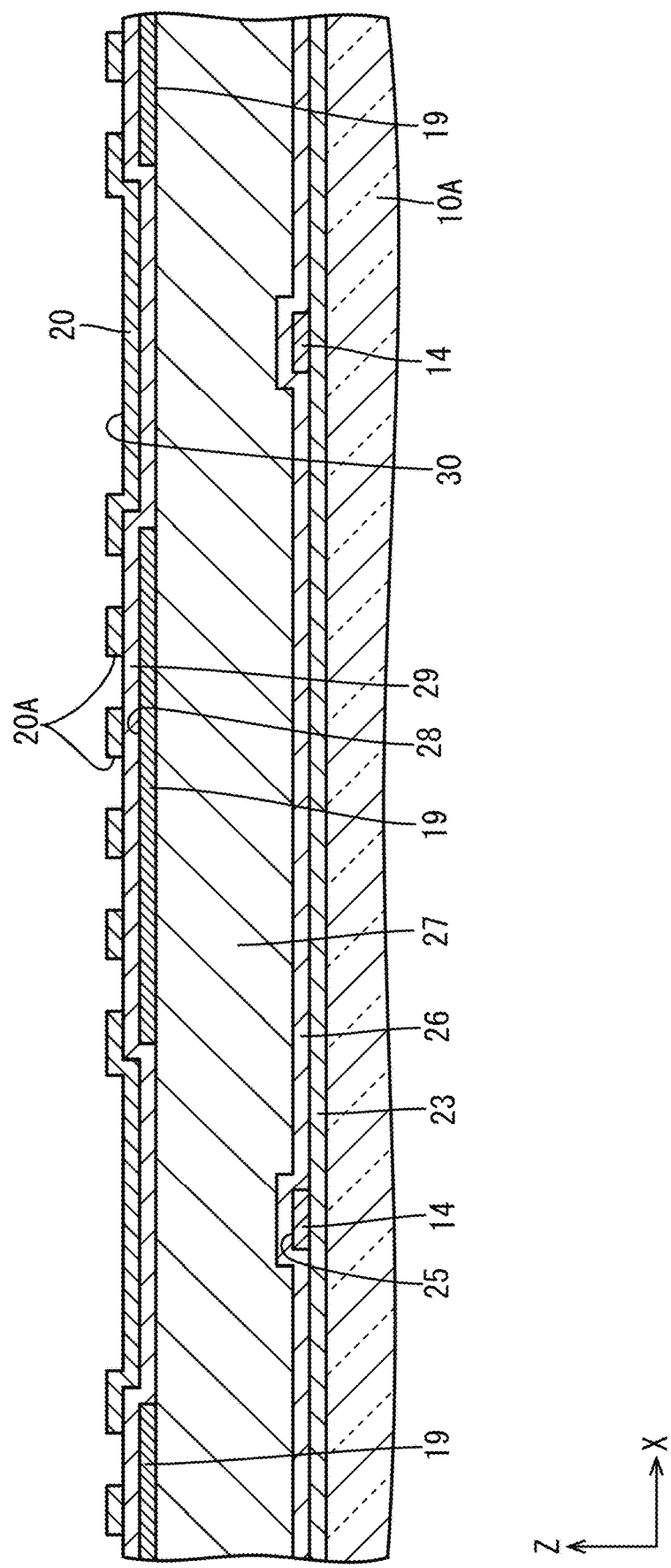
FIG. 5 is a cross-sectional view of the array substrate as taken along line B-B in FIG. 3.

The films of various types stacked over the inner surface of the array substrate 10A are described here with reference to FIGS. 4 and 5. FIG. 4 is a cross-sectional view of the array substrate 10A in and near a pixel transistor 18 (i.e. a cross-sectional view taken along line A-A in FIG. 3). FIG. 5 is a cross-sectional view of the array substrate 10A in and near source lines 14 and pixel electrodes 19 (i.e. a cross-sectional view taken along line B-B in FIG. 3). In the array substrate 10A, as shown in FIGS. 4 and 5, a first metal film (conducting film) 22, a gate insulating film (insulating film) 23, a semiconductor film 24, a second metal film (conducting film) 25, a first interlayer insulating film (insulating film) 26, a planarizing film (insulating film) 27, a first transparent electrode film (conducting film) 28, a second interlayer insulating film (conducting film, interelectrode insulating film) 29, and a second transparent electrode film (conducting film) 30 are stacked in this order starting from a lower layer (glass substrate). The first metal film 22 and the second metal film 25 each have conductivity and a light blocking effect by being made of a single-layer film composed of one type of metal material selected from among copper, titanium, aluminum, molybdenum, tungsten, and other metal materials or a laminated film or an alloy composed of different types of metal material. The first metal film 22 constitutes the gate lines 13 or other components. The second metal film 25 constitutes the source lines 14 or other components. The semiconductor film 24 is composed of a thin film made of a semiconductor material such as an oxide semiconductor or amorphous silicon. The first transparent electrode film 28 and the second transparent electrode 30 are composed of a transparent electrode material (such as ITO (indium tin oxide) or IZO (indium zinc oxide)). The first transparent electrode film 28 constitutes the pixel electrodes 19 or other components. The second transparent electrode film 30 constitutes the common electrode 20 or other components.

The gate insulating film 23, the first interlayer insulating film 26, and the second interlayer insulating film 29 are each composed of an inorganic material such as silicon nitride ($SiN_x$) or silicon oxide ($SiO_2$). The planarizing film 27 is composed of an organic insulating material (organic material) such as PMMA (acrylic resin), and is larger in film thickness than the other insulating films 23, 26, and 29 composed of an inorganic material. This planarizing film 27 planarizes a surface of the array substrate 10A. As shown in FIGS. 4 and 5, the gate insulating film 23 keeps the first metal film 22, which is at a lower layer than the gate insulating film 23, and the semiconductor film 24 and the second metal film 25, which are at a higher layer than the gate insulating film 23, insulated from each other. Accordingly, intersections between the gate lines 13, which are composed of the first metal film 22, and the source lines 14, which are composed of the second metal film 25, are insulated by the gate insulating film 23. The first interlayer insulating film 26 and the planarizing film 27 keep the semiconductor film 24 and the second metal film 25, which are at a lower layer than the first interlayer insulating film 26 and the planarizing film 27, and the first transparent electrode film 28, which is at a higher layer than the first interlayer insulating film 26 and the planarizing film 27, insulated from each other. The second interlayer insulating film 29 keeps the first transparent electrode film 28, which is at a lower layer than the second interlayer insulating film 29, and the second transparent electrode film 30, which is at a higher layer than the second interlayer insulating film 29, insulated from each other.

The configuration of each of the pixel transistors 18 is described with reference to FIGS. 3 and 4. As shown in FIGS. 3 and 4, each of the pixel transistors 18 has a pixel gate electrode 18A connected to a gate line 13, a pixel source electrode 18B connected to a source line 14, a pixel drain electrode 18C connected to a pixel electrode 19, and a pixel channel section 18D connected to the pixel source electrode 18B and the pixel drain electrode 18C and disposed to overlap the pixel gate electrode 18A via the gate insulating film 23. The pixel gate electrode 18A is constituted by the vicinity of a portion of the gate line 13 intersecting the source line 14, and is composed of the same first metal film 22 as the gate line 13. The gate line 13 is formed to be partially narrow in width so as not to overlap a site of the pixel drain electrode 18C connected to the pixel electrode 19. The pixel source electrode 18B is formed by increasing the width of a portion of the source line 14 intersecting the gate line 13, and is composed of the same second metal film 25 as the source line 14. The pixel drain electrode 18C is disposed in a location at a distance from the pixel source electrode 18B in the X-axis direction, and is composed of the same second metal film 25 as the pixel source electrode 18B. The pixel drain electrode 18C extends along the X-axis direction, has a first end connected to the pixel channel section 18D, and has a second end connected to the pixel electrode 19. The pixel drain electrode 18C, which is composed of the second metal film 25, and the pixel electrode 19, which is composed of the first transparent electrode film 28, are connected to each other through a pixel contact hole CH1 bored through the first interlayer insulating film 26 and the planarizing film 27, which are sandwiched between the pixel drain electrode 18C and the pixel electrode 19. The pixel channel section 18D extends along the X-axis direction, has a first end connected to the pixel source electrode 18B, has a second end connected to the pixel drain electrode 18C, and is composed of the semiconductor film 24. Moreover, when driven in accordance with a scanning signal that is supplied from the gate line 13 to the pixel gate electrode 18A, the pixel transistor 18 thus configured supplies, from the pixel source electrode 18B to the pixel drain electrode 18C via the pixel channel section 18D, an image signal that is supplied from the source line 14, thereby making it possible to charge the pixel electrode 19 to a potential based on the image signal. Using an oxide semiconductor as the semiconductor material of which the semiconductor film 24 is made allows the pixel channel section 18D to have higher mobility, and is therefore suitable to achieving, for example, a reduction in size of the pixel transistor 18.

Next, a configuration of components in and near an extended outer shape section 10EX of the array substrate 10A is described with reference to, for example, FIGS. 2 and 3. As shown in FIG. 2, those of the pixel transistors 18 and the pixel electrodes 19 located at an outer end of the non-rectangular display area AA2 of the display area AA in the array substrate 10A are arranged, microscopically, in a substantially stepped manner in parallel with the extended outer shape section 10EX. That is, in the non-rectangular display area AA2 of the display area AA, the numbers of pixel transistors 18 and pixel electrodes 19 arranged in the Y-axis direction vary according to locations in the X-axis direction, and tend to become larger toward the center of the liquid crystal panel 10 (i.e. toward the right in FIG. 2, toward the rectangular display area AA1, or toward the driver 11) in the X-axis direction and become smaller toward an end of the liquid crystal panel 10 (toward the left in FIG. 2) in the X-axis direction. Specifically, in FIG. 2, the numbers of pixel transistors 18 and pixel electrodes 19 arranged in the Y-axis direction in the non-rectangular display area AA2 of the display area AA vary so as to decrease or increase by one every three columns. In this case, color filters of three colors assuming R, G, and B are disposed to overlap pixel electrodes 19 belonging to three columns that are equal in number of pixel transistors 18 and pixel electrodes 19 arranged in the Y-axis direction to one another. In the rectangular display area AA1 of the display area AA, the numbers of pixel transistors 18 and pixel electrodes 19 arranged in the Y-axis direction are constant regardless of locations in the X-axis direction. Accordingly, the lengths of source lines 14 connected to a plurality of the pixel transistors 18 arranged along the Y-axis direction in the non-rectangular display area AA2 vary according to locations in the X-axis direction, and tend to become larger toward the center of the liquid crystal panel 10 in the X-axis direction and become smaller toward the end of the liquid crystal panel 10 in the X-axis direction. A longer source line 14 tends to be larger in area of overlap with the common electrode 20 and intersect a larger number of gate lines 13, and a shorter source line 14 tends to be smaller in area of overlap with the common electrode 20 and intersect a smaller number of gate lines 13. Further, the lengths of gate lines 13 connected to a plurality of the pixel transistors 18 arranged along the X-axis direction vary according to locations in the Y-axis direction, and tend to become larger toward a side of the liquid crystal panel 10 facing away from the driver 11 (i.e. toward a higher position in FIG. 2) in the Y-axis direction and become smaller toward a side of the liquid crystal panel 10 facing the driver 11 (i.e. toward a lower position in FIG. 2) in the Y-axis direction. As a longer gate line 13 tends to intersect a larger number of source lines 14, and as a shorter gate line 13 tends to intersect a smaller number of source lines 14.

In the non-display area NAA adjacent to the non-rectangular display area AA2 of the display area AA in the array substrate 10A, as shown in FIGS. 2 and 3, a common wire 31, a gate circuit lead wire (scanning lead wire) 32, a switch circuit control wire 33, source lead wires 34, and a switch circuit 35 are disposed in addition to the gate circuit lead wire 16 and the image signal supply wire 17, which have been briefly described so far. The following describes the wires 16, 17, 31, 32, and 33 excluding the source lead wires 34 in order of proximity to the display area AA. The common wire 31 transmits a common potential signal that is supplied from the driver 11 or the flexible substrate 12, is largest in line width of the other wires 16, 17, 32, 33, and 34, and is connected to the common electrode 20. The common wire 31 is placed in proximity to the non-rectangular display area AA2 of the display area AA, and extends while being repeatedly bent in a substantially stepped manner along the arrangements of the pixel transistors 18 and the pixel electrode 19 located at the outer end of the non-rectangular display area AA2. A plurality of the gate lead wires 32 are disposed in such locations that the common wire 31 is interposed between the gate lead wires 32 and the non-rectangular display area AA2 of the display area AA, and extend while being repeatedly bent in a substantially stepped manner along the common wire 31. Each of the gate lead wires 32 has a first end connected to a gate circuit section 15, has a second end connected to an end of a gate line 13, transmits a scanning signal that is supplied from the gate circuit section 15, and supplies the scanning signal to the gate line 13. In FIG. 2, the gate lead wire 32 has its first end extended to the upper left in FIG. 2. A portion of the second end of the gate lead wire 32 extended to the gate line 13 to which the second end is connected intersects the common wire 31.

As shown in FIGS. 2 and 3, a plurality of the switch circuit control wires 33 are disposed in such locations that the common wire 31 and the gate lead wires 32 are interposed between the switch circuit control wires 33 and the non-rectangular display area AA2 of the display area AA, and extend while being repeatedly bent in a substantially stepped manner substantially along the common wire 31 and the gate lead wires 32. The switch circuit control wires 33 transmit switch control signals that are supplied from the driver 11, and are connected to the switch circuit 35. A plurality of the image signal supply wires 17 are disposed in such locations that the common wire 31, the gate lead wires 32, and the switch circuit control wires 33 are interposed between the image signal supply wires 17 and the non-rectangular display area AA2 of the display area AA, and extend while being repeatedly bent substantially along the common wire 31, the gate lead wires 32, and the switch circuit control wires 33. The image signal supply wire 17 transmits an image signal that is supplied from the driver 11, and is connected to the switch circuit 35. The image signal supply wire 17 is supplied with image signals from the driver 11 in a time-division manner. Specifically, during a one-frame display period, the image signal supply wire 17 is supplied with three image signals, namely a red image signal responsible for a display of a red pixel, a green image signal responsible for a display of a green pixel, and a blue image signal responsible for a display of a blue pixel, in a time-division manner. The gate circuit lead wire 16 is disposed in such a location that the common wire 31, the gate led wires 32, the switch circuit control wires 33, and the image signal supply wire 17 are interposed between the gate circuit lead wire 16 and the non-rectangular display area AA2 of the display area AA, i.e. the location closest to the outer end (extended outer shape section 10EX) of the liquid crystal panel 10, and extends substantially along the extended outer shape section 10EX. The gate circuit lead wire 16 transmits a gate circuit control signal such as a clock signal and an initialization signal that are supplied from the driver 11 or the flexible substrate 12, and is connected to the gate circuit section 15.

Figure 6:
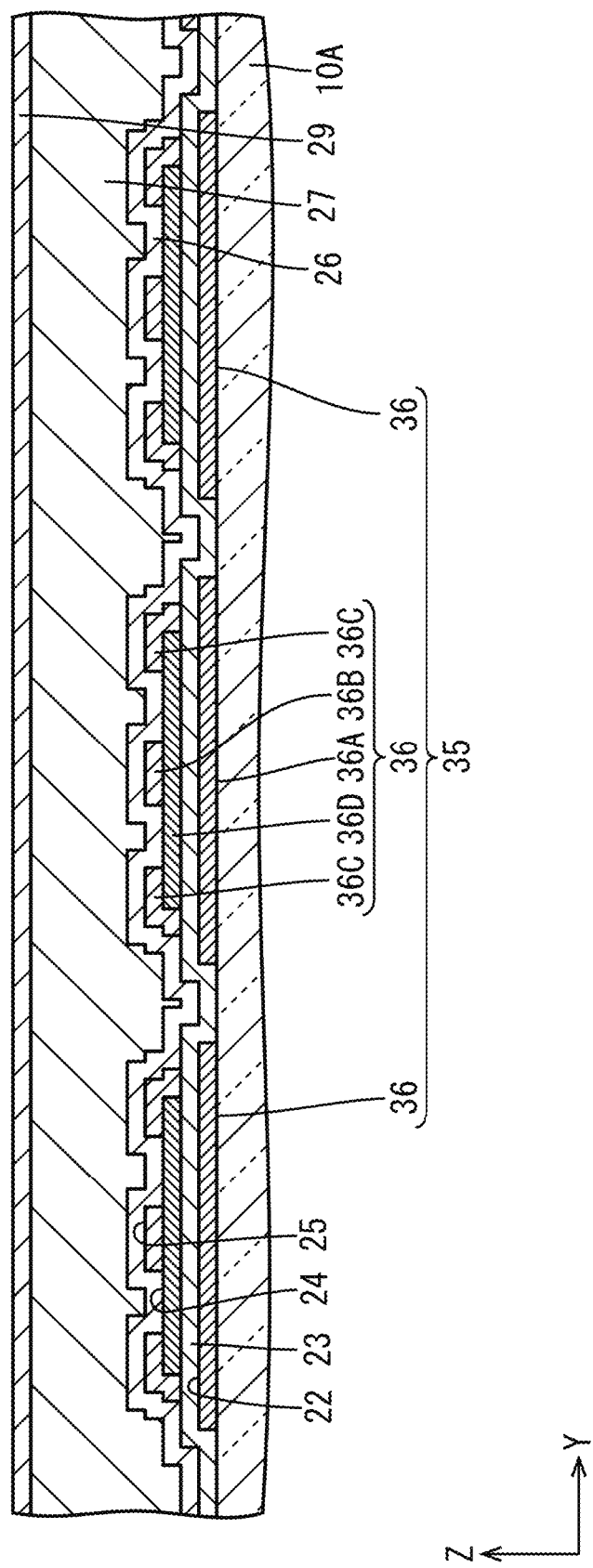
FIG. 6 is a cross-sectional view of the array substrate as taken along line C-C in FIG. 3.

The source lead wires 34 and the switch circuit 35 are described with reference to FIGS. 3 and 6. FIG. 6 is a cross-sectional view of the array substrate 10A in and near the switch circuit 35 (i.e. a cross-sectional view taken along line C-C). As shown in FIG. 3, the source lead wires 34 extend substantially along the Y-axis direction, have first ends connected to ends of source lines 14 facing the driver 11 (downward in FIG. 3) in the Y-axis direction, and have second ends connected to the switch circuit 35. Since the source lead wires 34 are thus connected to the source lines 14 and the switch circuit 35, the source lead wires 34 have such a positional relationship as to pass transversely across the common wire 31 and the gate lead wires 32, which are disposed in such a manner as to be interposed between the source lines 14 and the switch circuit 35. The number of source lead wires 34 provided is equal to the number of source lines 14 provided. Further, of three source lead wires 34 connected to three source lines 14 connected via pixel transistors 18 to three columns of pixel electrodes 19 arranged in equal numbers in the Y-axis direction, the source lead wire 34 located on the right in FIG. 3 is larger in length than the two source lead wires 34 located on the left and the center in FIG. 3. The switch circuit 35 has a switch transistor 36 for sorting, to each source lead wire 34, an image signal that is supplied by the image signal supply wire 17. Three of these switch transistors 36 are arranged along the Y-axis direction, and one switch circuit 35 is constituted by these three switch transistors 36. The number of switch transistors 36 constituting the switch transistor 35 coincides with the number of image signals to be sorted, and in the present embodiment, a red image signal, a green image signal, and a blue image signal are sorted to a source lead wire 34 connected to a red pixel source line 14, a source lead wire 34 connected to a green pixel source line 14, and a source lead wire 34 connected to a blue pixel source line 14, respectively. This switch circuit 35 causes the number of image signal supply wires 17 provided to be reduced to approximately ⅓ of each of the numbers of source lines 14 and source lead wires 34 provided. This reduces space in the non-display area NAA for placement of the image signal supply wires 17, achieving a narrower frame.

As shown in FIGS. 3 and 6, each of the switch transistors 36 has a gate electrode 36A connected to a switch circuit control wire 33, a source electrode 36B connected to the image signal supply wire 17, a drain electrode 36C connected to a source lead wire 34, and a channel section 36D connected to the source electrode 36B and the drain electrode 36C and disposed to overlap the gate electrode 36A. The gate electrode 36A is formed by partially increasing the width of the switch circuit control wire 33, has a long and thin substantially rectangular shape extending along the X-axis direction, and is composed of the first metal film 22. The source electrode 36B is in the shape of a belt extending along the X-axis direction by branching off from an end of the image signal supply wire 17. The source electrode 36B is disposed near the center of the gate electrode 36A in the Y-axis direction to overlap the gate electrode 36A, and is composed of the second metal film 25. The drain electrode 36C is in the shape of belts each extending along the X-axis direction by branching off from an end of the source lead wire 34 into two branches. The drain electrode 36C is placed on both sides of the source electrode 36B at distances from the source electrode 36B in the Y-axis direction so that the source electrode 36B is interposed, is disposed near both ends of the gate electrode 36A in the Y-axis direction to overlap the gate electrode 36A, and is composed of the same second metal film 25 as the source electrode 36B. The channel section 36D is disposed in such a manner as to lie astride the source electrode 36B and a pair of the drain electrodes 36C, has a long and thin substantially rectangular shape extending along the X-axis direction, and is a size smaller than the gate electrode 36A. The channel section 36D is composed of the semiconductor film 24, and the gate insulating film 23 is sandwiched between the channel section 36D and the gate electrode 36A, which the channel section 36D overlaps. The switch transistor 36 is driven at a timing when a switch control signal is supplied to the gate electrode 36A by the switch circuit control wire 33. Then, an image signal that is supplied to the source electrode 36B by the image signal supply wire 17 is transmitted via the channel section 36D to the drain electrode 36C, transmitted from the drain electrode 36C to the source lead wire 34, and then supplied to the source line 14. Accordingly, by supplying switch control signals in sequence to three switch circuit control wires 33 in synchronization with the time-division supply of a red image signal, a green image signal, and a blue image signal as image signals to one image signal supply wire 17, the three switch transistors 36 are driven in sequence, and the image signals of the respective colors are sorted to the source lines 14 for the pixels of the respective colors.

Figure 7:
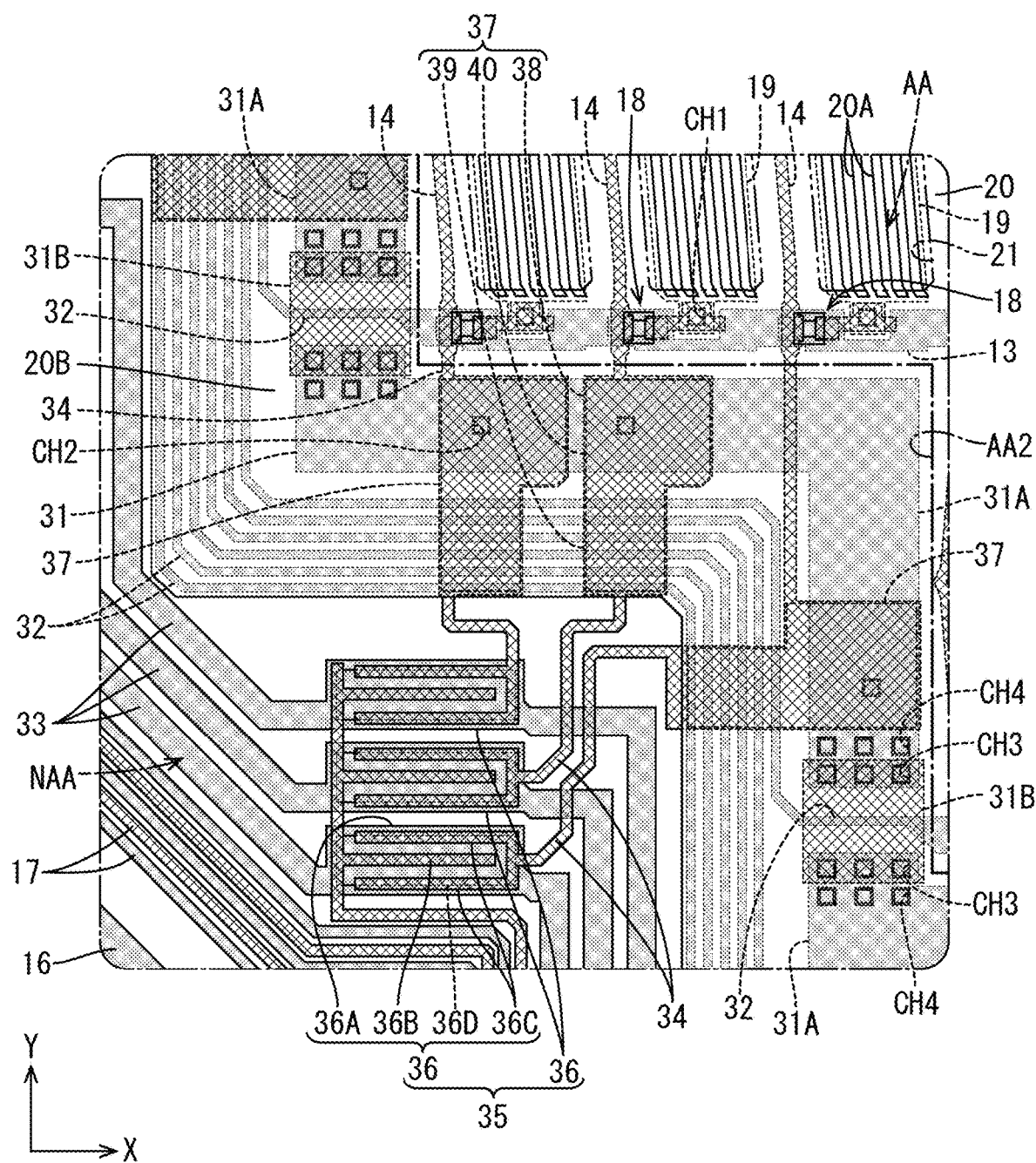
FIG. 7 is a plan view showing a configuration of components in and near the capacitance wire, the source lead wires, and the switch circuit in the array substrate with a focus on patterns of a first metal film and a second metal film.

Next, a film configuration of each of the wires 16, 17, 31, 32, 33, and 34 provided in and near an extended outer shape section 10EX of the array substrate 10A is described with reference to FIG. 7. FIG. 7 is a plan view showing a configuration of components in and near the extended outer shape section 10EX with a focus on patterns of the first metal film 22 and the second metal film 25. FIG. 7 uses different types of half-tone dot meshing to illustrate the patterns of the first metal film 22 and the second metal film 25. As shown in FIG. 7, the gate circuit lead wire 16, the gate lead wires 32, and the switch circuit control wires 33 are all composed of the first metal film 22. The source lead wires 34 are composed of the same second metal film 25 as the source lines 14 and the drain electrodes 36C to which the source lead wires 34 are connected. The image signal supply wire 17 includes an image signal supply wire 17 composed of the first metal film 22 and an image signal supply wire 17 composed of the second metal film 25. The image signal supply wire 17 composed of the first metal film 22 and the image signal supply wire 17 composed of the second metal film 25 are placed adjacent to each other. This makes it possible to array the image signal supply wires 17 at smaller pitches, which is suitable to achieving a narrower frame. The common wire 31 is constituted by a plurality of main wiring components 31A composed of the first metal film 22 and a plurality of gate lead wire intersections (scanning lead wire intersections) 31B composed of the second metal film 25. The main wiring components 31A, which are composed of the first metal film 22, constitute portions of the common wire 31 intersecting the source lead wires 34, which are composed of the second metal film 25, i.e. a large portion of the common wire 31 excluding portions of the common wire 31 intersecting the gate lead wires 32, which are composed of the first metal film 22, thereby avoiding short circuits with the source lead wires 34. The gate lead wire intersections 31B, which are composed of the second metal film 25, constitute the portions of the common wire 31 intersecting the gate lead wires 32, which are composed of the first metal film 22, thereby avoiding short circuits with the gate lead wires 32. That is, the common wire 31 avoids short circuits with the gate lead wire 32 by bridging the main wiring components 31A with the gate lead wire intersections 31B. The plurality of main wiring components 31A and the plurality of gate lead wire intersections 31B are alternately and repeatedly arranged in a direction parallel with the length of the common wire 31 and connected to each other by the after-mentioned connecting structures.

Figure 8:
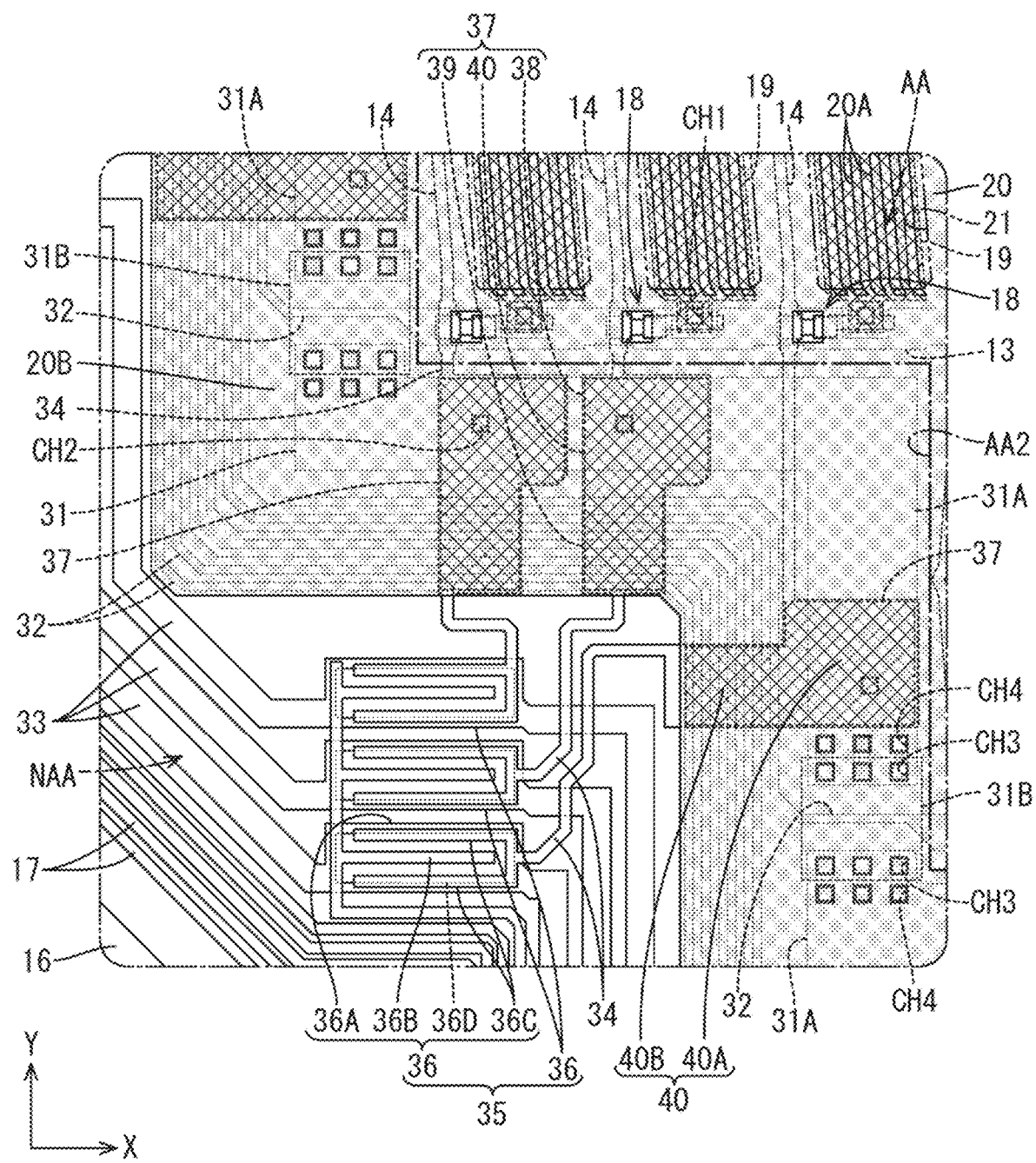
FIG. 8 is a plan view showing a configuration of components in and near the capacitance wire, the source lead wires, and the switch circuit in the array substrate with a focus on patterns of a first transparent electrode film and a second transparent electrode film.

A range of formation of the common electrode 20 in and near an extended outer shape section 10EX of the array substrate 10A is described with reference to FIG. 8. FIG. 8 is a plan view showing a configuration of components in and near the extended outer shape section 10EX with a focus on patterns of the first transparent electrode film 28 and the second transparent electrode film 30. FIG. 8 uses different types of half-tone dot meshing to illustrate the patterns of the first transparent electrode film 28 and the second transparent electrode film 30. It should be noted that although FIG. 8 uses the same type of half-tone dot meshing to illustrate the first transparent electrode film 28 as that which FIG. 7 uses to illustrate the second metal film 25, these are different conducting films. Similarly, although FIG. 8 uses the same type of half-tone dot meshing to illustrate the second transparent electrode film 30 as that which FIG. 7 uses to illustrate the first metal film 22, these are different conducting films. As shown in FIG. 8, the common electrode 20 is disposed substantially all over the display area AA (excluding portions of the common electrode 20 overlapping the pixel channel sections 18D of the pixel transistors 18 and the pixel electrode overlap openings 20A), and is partially disposed in the non-display area NAA. In particular, the common electrode 20 has an outside-the-display-area common electrode section 20B, which is a portion of the common electrode 20 disposed in the non-display area NAA. The outside-the-display-area common electrode section 20B is disposed to overlap the whole areas of the common wire 31 and the gate lead wires 32 and overlap parts of the source lead wires 34 (such as portions of the source lead wires 34 intersecting the common wire 31 and the gate lead wires 32), and has its outer end located closer to the outside than the outermost one of the plurality of gate lead wires 32. Accordingly, the outside-the-display-area common electrode section 20B does not overlap the where areas of the gate circuit lead wire 16, the image signal supply wire 17, the switch circuit control wires 33, and the switch circuit 35, and does not overlap parts of the source lead wires 34 (i.e. portions of the source lead wires 34 closer to the switch circuit 35 than the gate lead wires 32). In particular, since the outside-the-display-area common electrode section 20B is disposed not to overlap the switch circuit 35, an off-leak current is hardly generated in the switch transistors 36 due to an electric field that is generated from the outside-the-display-area common electrode section 20B.

Incidentally, as already mentioned, the plurality of source lines 14 arranged at spacings in the X-axis direction in the non-rectangular display area AA2 of the display area AA vary in length according to locations in the X-axis direction as shown in FIG. 2 and, accordingly, vary in area of overlap with the common electrode 20 and vary in number of gate lines 13 that the source lines 14 intersect. For this reason, source lines 14 having different lengths form different parasitic capacitances with the common electrode 20. Further, source lines 14 having different lengths form different parasitic capacitances with the gate lines 13. For this reason, for example, even in a case where the plurality of source lines 14 are supplied with image signals of the same potential, there occur differences in potential among the pixel electrodes 19, to which the image signals are supplied separately by each of the source lines 14, due to differences among parasitic capacitances that are formed between the plurality of source lines 14 and the common electrode 20 and differences among parasitic capacitances that are formed between the plurality of source lines 14 and the gate lines 13, so that the differences may be viewed as display unevenness.

To address this problem, in the non-display area NAA of the array substrate 10A according to the present embodiment, as shown in FIG. 8, there are provided a plurality of capacitance forming sections 37, connected to a plurality of the source lead wires 34, that form electrostatic capacitances with the common electrode 20 and the common wire 31. The capacitance forming sections 37 are disposed to overlap the common electrode 20 via the second interlayer insulating film 29, and are disposed to overlap the common wire 31 via the gate insulating film 23. Such a configuration brings the plurality of capacitance forming sections 37 to the same potentials as the plurality of source lines 14 via the plurality of source lead wires 34. Moreover, electrostatic capacitances are formed between the plurality of capacitance forming sections 37 and the common electrode 20, and electrostatic capacitances are formed between the plurality of capacitance forming sections 37 and the common wire 31. As a result, a load that is applied to a source line 14 includes a parasitic capacitance that is formed between the source line 14 and the common electrode 20, an electrostatic capacitance that is formed between a capacitance forming section 37 and the common electrode 20, and an electrostatic capacitance that is formed between the capacitance forming section 37 and the common wire 31. Accordingly, differences among loads that are applied to the plurality of source lines 14 can be reduced by adjusting electrostatic capacitances that are formed between the plurality of capacitance forming sections 37 and the common electrode 20 and electrostatic capacitances that are formed between the plurality of capacitance forming sections 37 and the common wire 31. This makes it hard to view display unevenness that may arise due to differences among loads.

In the following, a specific technique for adjusting electrostatic capacitances by using the plurality of capacitance forming sections 37 is described with reference to FIG. 2. In the present embodiment, as shown in FIG. 2, the plurality of capacitance forming sections 37 are configured to become smaller in area of overlap with the common electrode 20 and the common wire 31 as the source lines 14 to which the plurality of capacitance forming sections 37 are connected via the source lead wires 34 become larger in length. In particular, a capacitance forming section 37 that is connected via a source lead wire 34 to a longer one of a plurality of source lines 14 having different lengths and brought to the same potential as the longer source line 14 is smaller in area of overlap with the common electrode 20 and the common wire 31. On the other hand, a capacitance forming section 37 that is connected via a source lead wire 34 to a shorter one of the source lines 14 and brought to the same potential as the shorter source line 14 is larger in area of overlap with the common electrode 20 and the common wire 31. In more particular, in the present embodiment, three source lines 14 connected via pixel transistors 18 to three columns of pixel electrodes 19 arranged in equal numbers in the Y-axis direction are substantially the same in length as one another, but three source lead wires 34 to which those three source lines 14 are connected include two source lead wires 34 that are the same in length as each other and one source lead wire 34 that is larger in length than the two source lead wires 34. Accordingly, a comparison between two capacitance forming sections 37, included in three capacitance forming sections 37 that are at the same potentials as the above three source lines 14, that are at the same potentials as two source lines 14 connected to the two source lead wires 34 of equal length and one capacitance forming section 37, included in the three capacitance forming sections 37, that is at the same potential as one source line 14 connected to the one source lead wires 34 of larger length shows that whereas the two capacitance forming sections 37 are larger in area of overlap with the common electrode 20 and the common wire 31 than the one capacitance forming section 37, the one capacitance forming section 37 is smaller in area of overlap with the common electrode 20 and the common wire 31 than the two capacitance forming sections 37. Such a configuration reduces an electrostatic capacitance that is formed by a capacitance forming section 37 connected via a source lead wire 34 to a source line 14 that, due to its large length, tends to form a large parasitic capacitance with the common electrode 20 or the common wire 31. On the other hand, such a configuration increases an electrostatic capacitance that is formed by a capacitance forming section 37 connected via a source lead wire 34 to a source line 14 that, due to its small length, tends to form a small parasitic capacitance with the common electrode 20 or the common wire 31. This makes it possible to suitably reduce differences among loads that are applied to the plurality of source lines 14, satisfactorily reducing the appearance of display unevenness attributed to differences among loads.

Figure 9:
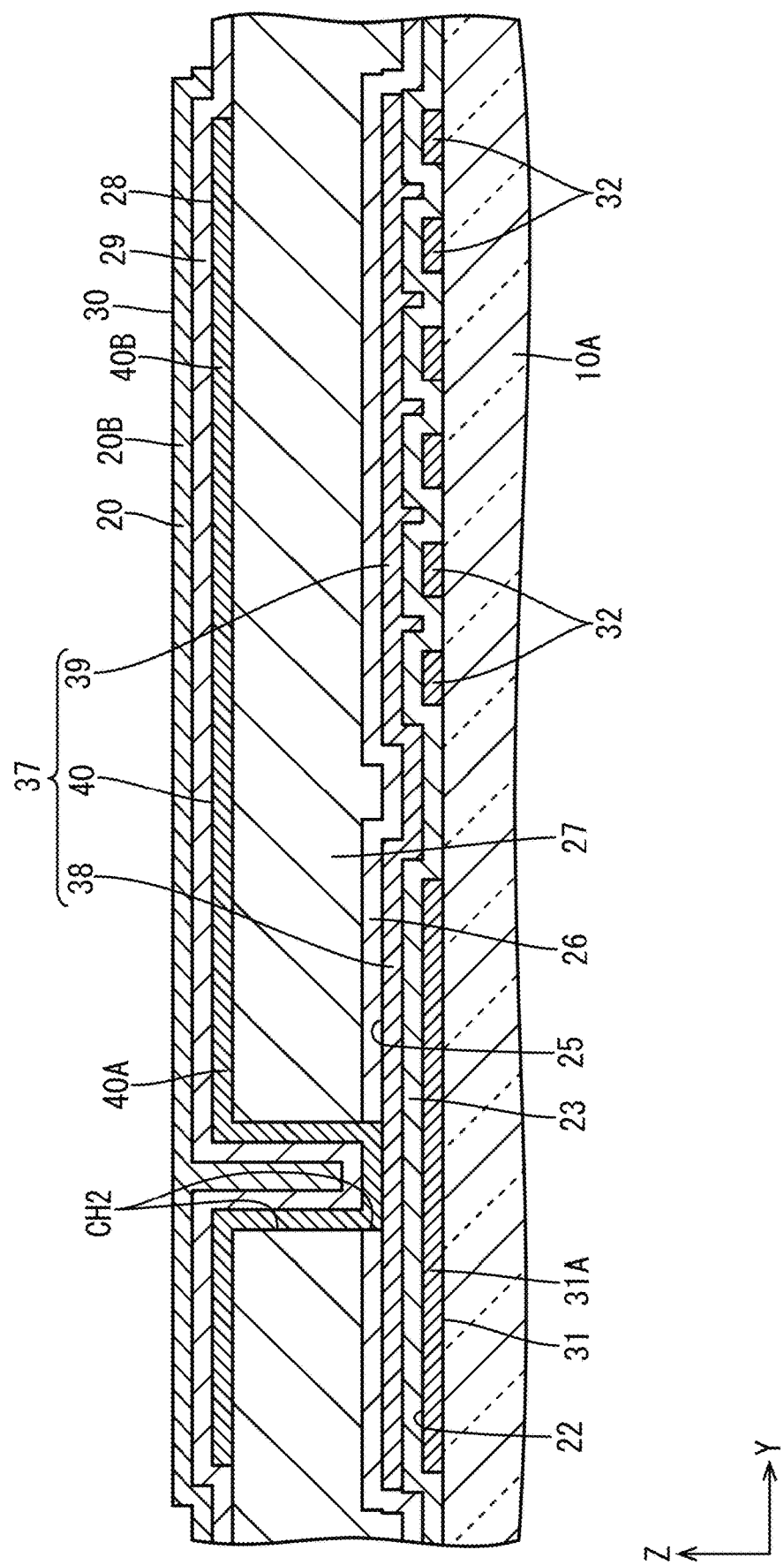
FIG. 9 is a cross-sectional view of the array substrate as taken along line D-D in FIG. 3.
Figure 10:
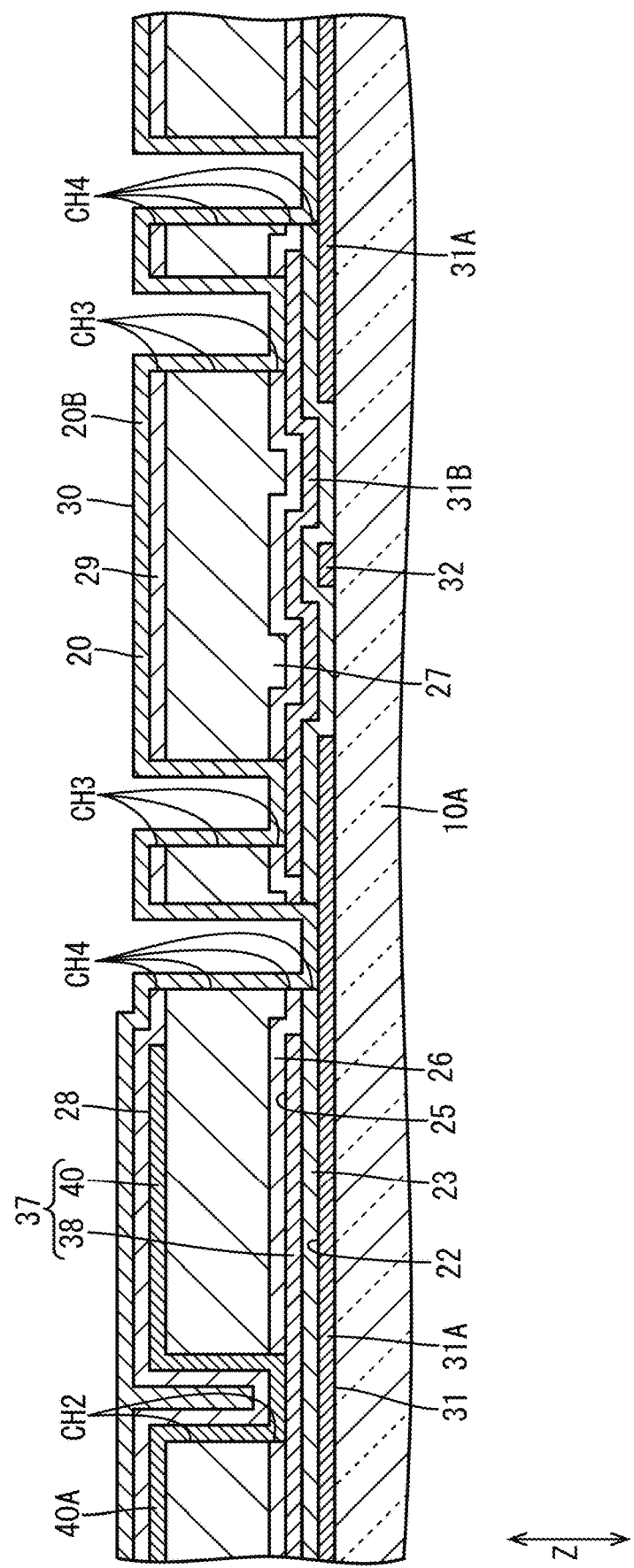
FIG. 10 is a cross-sectional view of the array substrate as taken along line E-E in FIG. 3.

As shown in FIGS. 7, 9, and 10, each of the capacitance forming sections 37 includes a common wire capacitance forming section 38 that forms an electrostatic capacitance with the common wire 31. FIG. 9 is a cross-sectional view of the array substrate 10A as formed by cutting through the vicinity of the common wire 31, gate lead wires 32, and a capacitance forming section 37 (i.e. a cross-sectional view taken along line D-D in FIG. 3). FIG. 10 is a cross-sectional view of the array substrate 10A as formed by cutting through the vicinity of the common wire 31 and a capacitance forming section 37 (i.e. a cross-sectional view taken along line E-E in FIG. 3). The common wire capacitance forming section 38 is composed of the same second metal film 25 as the source lead wires 34, and is directly joined to a source lead wire 34. The common wire capacitance forming section 38 is disposed to overlap the common wire 31, which is composed of the first metal film 22, via the gate insulating film 23. In other words, the common wire capacitance forming section 38 is formed by making a portion of the source lead wire 34 overlapping the common wire 31 larger in width than the other portion of the source lead wire 34. The common wire capacitance forming section 38 is sized to overlap the common wire 31 across the full width of the common wire 31 and protrude toward the switch circuit 35 (i.e. away from the display area AA) in a direction (i.e. the X-axis direction or the Y-axis direction) parallel with the width of the common wire 31. Further, a dimension of the common wire capacitance forming section 38 in the direction (i.e. the X-axis direction or the Y-axis direction) parallel with the length of the common wire 31 is larger than the line width of the source lead wire 34. A plurality of the common wire capacitance forming sections 38 are provided so as to be joined separately to each of the plurality of source lead wires 34, and the number of common wire capacitance forming sections 38 provided is equal to the number of source lead wires 34 provided (i.e. the number of source lines 14 provided). Accordingly, the plurality of common wire capacitance forming sections 38 are brought to the same potentials as the plurality of source lines 14 via the plurality of source lead wires 34 to each of which the plurality of common wire capacitance forming sections 38 are joined separately. Such a configuration causes electrostatic capacitances to be formed between the plurality of common wire capacitance forming sections 38, which are joined to the plurality of source lead wires 34, and the common wire 31. As a result, a load that is applied to a source line 14 includes a parasitic capacitance that is formed between the source line 14 and the common electrode 20 and an electrostatic capacitance that is formed between a common wire capacitance forming section 38 and the common wire 31. Accordingly, differences among loads that are applied to the plurality of source lines 14 can be reduced by adjusting electrostatic capacitances that are formed between the plurality of common wire capacitance forming sections 38 and the common wire 31. Since the common wire capacitance forming sections 38 are composed of the same second metal film 25 as the source lead wires 34, and are directly joined to the source lead wires 34, the common wire capacitance forming sections 38 need no special connecting structures (such as contact holes) for the source lead wires 34, as compared with the case of common wire capacitance forming sections constituted by a conducting film which is different from that which the source lead wires 34 are constituted by.

As shown in FIGS. 7, 9, and 10, each of the capacitance forming sections 37 includes a gate lead wire capacitance forming section (scanning wire line capacitance forming section) 39 that forms electrostatic capacitance with the gate lead wires 32. The gate lead wire capacitance forming section 39 is composed of the same second metal film 25 as the source lead wires 34 and the common wire capacitance forming section 38, and is directly joined to a source lead wire 34 and the common wire capacitance forming section 38. The gate lead wire capacitance forming section 39 is disposed to overlap the gate lead wires 32, which are composed of the first metal film 22, via the gate insulating film 23. In other words, the gate lead wire capacitance forming section 39 is formed by making a portion of the source lead wire 34 overlapping the plurality of gate lead wires 32 larger in width than the other portion of the source lead wire 34 excluding a portion of the source lead wire 34 overlapping the common wire 20. The gate lead wire capacitance forming section 39 overlaps all of the plurality of gate lead wires 32 in such a manner as to lie astride them. Further, a dimension of the gate lead wire capacitance forming section 39 in a direction (i.e. the X-axis direction or the Y-axis direction) parallel with the lengths of the gate lead wires 32 is larger than the line width of the source lead wire 34, but is smaller than the dimension of the common wire capacitance forming section 38 in the direction parallel with the length of the common wire 31. Accordingly, the area of overlap of the gate lead wire capacitance forming section 39 with the plurality of gate lead wires 32 is smaller than the area of overlap of the common wire capacitance forming section 38 with the common wire 31. A plurality of the gate lead wire capacitance forming sections 39 are provided so as to be joined separately to each of a plurality of pairs of a source lead wire 34 and a common wire capacitance forming section 38, and the number of gate lead wire capacitance forming sections 39 provided is equal to each of the numbers of source lead wires 34 and common wire capacitance forming sections 38 provided (i.e. the number of source lines 14 provided). Accordingly, the plurality of gate lead wire capacitance forming sections 39 are brought to the same potentials as the plurality of source lines 14 via the plurality of source lead wires 34 and the plurality of common wire capacitance forming sections 38 to each of which the plurality of gate lead wire capacitance forming sections 39 are joined separately. Such a configuration causes electrostatic capacitances to be formed between the plurality of gate lead wire capacitance forming sections 39 that are at the same potentials as the plurality of source lines 14 and the plurality of gate lead wires 32 that are at the same potentials as the plurality of gate lines 13. As a result, a load that is applied to a source line 14 includes a parasitic capacitance that is formed between the source line 14 and the common electrode 20, a parasitic capacitance that is formed between the source line 14 and a gate line 13, an electrostatic capacitance that is formed between a common wire capacitance forming section 38 and the common wire 31, and an electrostatic capacitance that is formed between a gate lead wire capacitance forming section 39 and a plurality of the gate lead wires 32. Accordingly, differences among loads that are applied to the plurality of source lines 14 can be reduced by adjusting electrostatic capacitances that are formed between the plurality of common wire capacitance forming sections 38 and the common wire 31 and adjusting electrostatic capacitances that are formed between the plurality of gate lead wire capacitance forming sections 39 and the plurality of gate lead wires 32. This reduces deterioration in display quality due to differences among loads. Moreover, since the gate lead wire capacitance forming sections 39 are composed of the same second metal film 25 as the source lead wires 34 and the common wire capacitance forming sections 38, and are directly joined to them, the gate lead wire capacitance forming sections 39 are high in connection reliability and need no special connecting structures (such as contact holes) for the source lead wires 34 or the common wire capacitance forming sections 38.

As shown in FIGS. 8 to 10, each of the capacitance forming sections 37 includes a common electrode capacitance forming section 40 that forms an electrostatic capacitance with the common electrode 20. A plurality of the common electrode capacitance forming sections 40 are provided so as to be connected separately via the plurality of common wire capacitance forming sections 38 to the plurality of source lead wires 34, and the number of common electrode capacitance forming sections 40 provided is equal to each of the numbers of source lead wires 34 and common wire capacitance forming sections 38 provided (i.e. the number of source lines 14 provided). Accordingly, the plurality of common electrode capacitance forming sections 40 are brought to the same potentials as the plurality of source lines 14 via the plurality of source lead wires 34 and the plurality of common wire capacitance forming sections 38. Moreover, the common electrode capacitance forming sections 40 are composed of the same first transparent electrode film 28 as the pixel electrodes 19, and are disposed to overlap parts of the outside-the-display-area common electrode section 20B of the common electrode 20, which is composed of the second transparent electrode film 30, via the second interlayer insulating film 29. Such a configuration causes electrostatic capacitances to be formed between the plurality of common electrode capacitance forming sections 40 connected separately via the plurality of common wire capacitance forming sections 38 to the plurality of source lead wires 34 and the outside-the-display-area common electrode section 20B of the common electrode 20. As a result, a load that is applied to a source line 14 includes a parasitic capacitance that is formed between the source line 14 and the common electrode 20 and an electrostatic capacitance that is formed between a common electrode capacitance forming section 40 and the common electrode 20. Accordingly, differences among loads that are applied to the plurality of source lines 14 can be reduced by adjusting electrostatic capacitances that are formed between the plurality of common electrode capacitance forming sections 40 and the common electrode 20. Since the plurality of common electrode capacitance forming sections 40 are connected to the plurality of common wire capacitance forming sections 38, which are joined to the plurality of source lead wires 34, higher connection reliability is achieved than in the case of a plurality of common electrode capacitance forming sections directly connected to the plurality of source lead wires 34. Further, since the second interlayer insulating film 29, which is sandwiched between the pixel electrodes 19 and the common electrode 20, is set to such a film thickness that a sufficiently high-intensity electric field is generated between the pixel electrodes 19 and the common electrode 20, a sufficiently large electrostatic capacitance is formed between the common electrode capacitance forming section 40 and the common electrode 20. This makes it possible to more easily reduce differences among loads that are applied to the plurality of source lines 14.

As shown in FIGS. 8 to 10, each of the common electrode capacitance forming sections 40, which are composed of the first transparent electrode film 28, has a first overlap section 40A disposed to overlap the common wire capacitance forming section 38, which is composed of the second metal film 25. The first overlap section 40A is substantially the same in size as the common wire capacitance forming section 38 when seen in plan view, and is disposed to substantially entirely overlap the common wire capacitance forming section 38. Accordingly, the first overlap section 40A is sized to overlap the common wire 31 across the full width of the common wire 31 and protrude toward the switch circuit 35 in the direction parallel with the width of the common wire 31. Further, a dimension of the first overlap section 40A in the direction parallel with the length of the common wire 31 is larger than the line width of the source lead wire 34. Moreover, the first overlap section 40A is connected to the common wire capacitance forming section 38, which the first overlap section 40A is disposed to overlap, through an inter-capacitance-forming-section contact hole CH2 bored through the first interlayer insulating film 26 and the planarizing film 27, which are sandwiched between the first overlap section 40A and the common wire capacitance forming section 38. The inter-capacitance-forming-section contact hole CH2 is disposed near the center of the common wire 31 in the direction parallel with the width of the common wire 31. Such a configuration makes it possible to reduce space for placement as much as the first overlap section 40A is disposed to overlap the common wire capacitance forming section 38 via the first interlayer insulating film 26 and the planarizing film 27, as compared with a case where a common electrode capacitance forming section and a common wire capacitance forming section are disposed not to overlap each other. This is suitable to achieving a narrower frame. Further, since neither the common wire 31, which is composed of the first metal film 22, nor the common electrode 20, which is composed of the second transparent electrode film 30, is sandwiched between the common wire capacitance forming section 38, which is composed of the second metal film 25, and the common electrode capacitance forming section 40, which is composed of the first transparent electrode film 28, there is no need to form an opening in the common wire 31 or the common electrode 20 in connecting the common wire capacitance forming section 38 and the common electrode capacitance forming section 40 to each other. This makes it hard for the common electrode capacitance forming section 40, which is disposed at a higher layer than the common wire capacitance forming section 38, to be short-circuited with the common wire 31 or the common electrode 20.

As shown in FIGS. 8 and 9, each of the common electrode capacitance forming sections 40, which are composed of the first transparent electrode film 28, has a second overlap section 40B disposed to overlap the gate lead wires 32, which are composed of the first metal film 22. The second overlap section 40B is substantially the same in size as the gate lead wire capacitance forming section 39 when seen in plan view, and is disposed to substantially entirely overlap the gate lead wire capacitance forming section 39. Accordingly, the second overlap section 40B, which is composed of the first transparent electrode film 28, is disposed to overlap the gate lead wire capacitance forming section 39, which is composed of the second metal film 25, via the first interlayer insulating film 26 and the planarizing film 27, and is disposed to overlap the gate lead wires 32 via the gate insulating film 23, the gate lead wire capacitance forming section 39, the first interlayer insulating film 26, and the planarizing film 27. The second overlap section 40B overlaps all of the plurality of gate lead wires 32 in such a manner as to lie astride them. Further, a dimension of the second overlap section 40B in the direction parallel with the lengths of the gate lead wires 32 is larger than the line width of the source lead wire 34, but is smaller than the dimension of the first overlap section 40A in the direction parallel with the length of the common wire 31. Accordingly, the area of overlap of the second overlap section 40B with the plurality of gate lead wires 32 and the gate lead wire capacitance forming section 39 is smaller than the area of overlap of the first overlap section 40A with the common electrode 20 and the common wire capacitance forming section 38. Since the common electrode capacitance forming section 40 has, in addition to the first overlap section 40A, which overlaps the common wire capacitance forming section 38, the second overlap section 40B, which is disposed to overlap the gate lead wires 32 via the gate insulating film 23, the first interlayer insulating film 26, and the planarizing film 27, the common electrode capacitance forming section 40 is larger in area than a common electrode capacitance forming section having only a first overlap section 40A. Accordingly, an electrostatic capacitance that is formed between the common electrode capacitance forming section 40 and the common electrode 20 can be increased. This makes it possible to more easily reduce differences among loads that are applied to the plurality of source lines 14, reducing deterioration in display quality due to differences among loads. Since the second overlap section 40B of the common electrode capacitance forming section 40 is placed in the space for placement of the gate lead wires 32, the space for placement can be reduced, as compared with the case of a common electrode capacitance forming section disposed not to overlap the gate lead wires 32. This is suitable to achieving a narrower frame.

The connecting structures by which the main wiring components 31A and the gate lead wire intersections 31B, which constitute the common wire 31, are connected to each other are described here with reference to FIGS. 7, 8, and 10. As shown in FIGS. 7, 8, and 10, the main wiring components 31A, which are composed of the first metal film 22, and the gate lead wire intersections 31B, which are composed of the second metal film 25, are connected to each other via the outside-the-display-area common electrode section 20B of the common electrode 20, which is composed of the second transparent electrode film 30. As already mentioned, the outside-the-display-area common electrode section 20B of the common electrode 20 is disposed to overlap the whole area of the common wire 31. On the other hand, ends of the main wiring components 31A in the direction parallel with the length of the common wire 31 and ends of the gate lead wire intersections 31B in the direction parallel with the length of the common wire 31 are disposed to overlap each other with the gate insulating film 23 sandwiched therebetween. First common wire contact holes CH3 are bored through the first interlayer insulating film 26, the planarizing film 27, and the second interlayer insulating film 29, which are sandwiched between the gate lead wire intersections 31B and the outside-the-display-area common electrode section 20B, so as to be in such places as to overlap sites of the gate lead wire intersections 31B overlapping the main wiring components 31A. Connections between the gate lead wire intersections 31B and the outside-the-display-area common electrode section 20B are made through these first common wire contact holes CH3. Three of these first common wire contact holes CH3 are arranged at spacings along the direction parallel with the width of the common wire 31. Second common wire contact holes CH4 are bored through the gate insulating film 23, the first interlayer insulating film 26, the planarizing film 27, and the second interlayer insulating film 29, which are sandwiched between the main wiring components 31A and the outside-the-display-area common electrode section 20B, so as to be in such places in the main wiring components 31A as not to overlap the gate lead wire intersections 31B and as to be adjacent to the first common wire contact holes CH3. Connections between the main wiring components 31A and the outside-the-display-area common electrode section 20B are made through these second common wire contact holes CH4. Three of these second common wire contact holes CH4 are arranged at spacings along the direction parallel with the width of the common wire 31. Thus, the main wiring components 31A and the gate lead wire intersections 31B are connected to the same outside-the-display-area common electrode section 20B through the first common wire contact holes CH3 and the second common wire contact holes CH4, respectively.

As noted above, as shown in FIG. 7, the common wire 31 has the gate lead wire intersections 31B, which are composed of the same second metal film 25 as the common wire capacitance forming sections 38. For this reason, in setting ranges of formation of the common wire capacitance forming sections 38, it is necessary to give consideration so that the common wire capacitance forming sections 38 are not short-circuited with the gate lead wire intersections 31B, which are composed of the same second metal film 25. On the other hand, the common electrode capacitance forming sections 40 are composed of the same first transparent electrode film 28 as the pixel electrodes 19, are located at a different layer from any of the gate lead wires 32, the source lead wires 34, the common wire capacitance forming sections 38, the main wiring components 31A, and the gate lead wire intersections 31B, and are kept insulated from them by the insulating films 23, 26, 27, and 29. Accordingly, in setting ranges of formation of the common electrode capacitance forming sections 40, it is not necessary to give consideration so that the common electrode capacitance forming sections 40 are not short-circuited with the gate lead wires 32, the source lead wires 34, the common wire capacitance forming sections 38, the main wiring components 31A, or the gate lead wire intersections 31B. This gives a high degree of freedom in the setting of the ranges of formation.

As described above, a liquid crystal panel (display device) 10 of the present embodiment includes a plurality of pixel electrodes 19 arranged in a row-wise direction and a column-wise direction and disposed so that the numbers of the pixel electrodes 19 arranged in the column-wise direction vary according to locations in the row-wise direction, a plurality of source lines (image lines) 14 extending along the column-wise direction and supplying image signals to the plurality of pixel electrodes 19 arranged in the column-wise direction, the plurality of source lines 14 being arranged in the row-wise direction and having lengths corresponding to the numbers of the pixel electrodes 19 arranged in the column-wise direction, a display area AA in which at least the plurality of source lines 14 and the plurality of pixel electrodes 19 are disposed, a common electrode 20 disposed in the display area AA to overlap the plurality of pixel electrodes 19 via a second interlayer insulating film (insulating film) 29 and partially disposed in an area outside the display area AA, a common wire 31, disposed in the area outside the display area AA, that supplies a common potential signal to the common electrode 20, a plurality of source lead wires (image lead wires) 34 drawn from the plurality of source lines 14 into the area outside the display area AA and disposed to intersect the common wire 31 via a gate insulating film (insulating film) 23, and a plurality of capacitance forming sections 37 connected to the plurality of source lead wires 34 in the area outside the display area AA and disposed to overlap at least either the common electrode 20 or the common wire 31 via at least either the second interlayer insulating film 29 or the gate insulating film 23.

In this way, the plurality of pixel electrodes 19 arranged in the row-wise direction and the column-wise direction are charged by being supplied with image signals by the plurality of source lines 14 arranged in the row-wise direction. This causes an electric field to be generated between the plurality of pixel electrodes 19 and the common electrode 20, which overlaps the plurality of pixel electrodes 19 via the second interlayer insulating film 29, so that an image is displayed in the display area AA by utilizing the electric field. The plurality of source lines 14 are supplied with image signals by the plurality of source lead wires 34 drawn into the area outside the display area AA. Incidentally, since the numbers of pixel electrodes 19 arranged in the column-wise direction vary according to locations in the row-wise direction, the plurality of source lines 14 arranged in the row-wise direction have lengths corresponding to the numbers of pixel electrodes 19, arranged in the column-wise direction, that are to be supplied with the image signals. That is, the plurality of source lines 14 include source lines 14 having different lengths, which causes differences among parasitic capacitances that may be formed between the source lines 14 and the common electrode 20. Then, for example, even in a case where the plurality of source lines 14 are supplied with image signals of the same potential, there occur differences in potential among the pixel electrodes 19, which are arranged in different numbers in the column-wise direction, due to differences among parasitic capacitances that are formed between the plurality of source lines 14 and the common electrode 20, so that the differences may be viewed as display unevenness.

In that respect, since the plurality of capacitance forming sections 37, which are disposed to overlap at least either the common electrode 20 or the common wire 31 via at least either the second interlayer insulating film 29 or the gate insulating film 23, are connected to the plurality of source lead wires 34 in the area outside the display area AA, electrostatic capacitances are formed between the plurality of capacitance forming sections 37, which are brought to the same potentials as the plurality of source lines 14 via the plurality of source lead wires 34, and at least either of the common electrode 20 and the common wire 31, which are at the same potential as each other. As a result, a load that is applied to a source line 14 includes a parasitic capacitance that is formed between the source line 14 and the common electrode 20 and an electrostatic capacitance that is formed between a capacitance forming section 37 and at least either the common electrode 20 or the common wire 31. Accordingly, differences among loads that are applied to the plurality of source lines 14 can be reduced by adjusting electrostatic capacitances that are formed between the plurality of capacitance forming sections 37 and at least either the common electrode 20 or the common wire 31. This reduces deterioration in display quality due to differences among loads.

Further, the capacitance forming sections 37 include a plurality of common wire capacitance forming sections 38 joined to the plurality of source lead wires 34 and disposed to overlap the common wire 31 via the gate insulating film (insulating film) 23. In this way, differences among loads that are applied to the plurality of source lines 14 can be reduced by the formation of electrostatic capacitances between the plurality of common wire capacitance forming sections 38, which are joined to the plurality of source lead wires 34, and the common wire 31. Since the common wire capacitance forming sections 38 are joined to the source lead wires 34, the common wire capacitance forming sections 38 need no special connecting structures for the source lead wires 34.

Further, the liquid crystal panel 10 further include a plurality of gate lines (scanning lines) 13 disposed to extend along the row-wise direction in the display area AA and intersect the source lines 14 via the gate insulating film (insulating film) 23 and arranged in the column-wise direction and a plurality of gate lead wires (scanning lead wires) 32 drawn from the gate lines 13 into the area outside the display area AA and disposed to intersect the plurality of source lead wires 34 via the gate insulating film (insulating film) 23, and the capacitance forming sections 37 include a plurality of gate lead wire capacitance forming sections (scanning lead wire capacitance forming sections) 39 joined to at least either the plurality of source lead wires 34 or the plurality of common wire capacitance forming sections 38 and disposed to overlap the gate lead wires 32 via the gate insulating film (insulating film) 23. In this way, the plurality of source lines 14, which have different lengths, intersect different numbers of the gate lines 13. For this reason, the plurality of source lines 14, which have different lengths, form different parasitic capacitances with the gate lines 13. In that respect, the capacitance forming sections 37 include the plurality of gate lead wire capacitance forming sections 39, which are disposed to overlap the gate lead wires 32, which are drawn from the gate lines 13 into the area outside the display area AA, via the gate insulating film 23. Since the plurality of gate lead wire capacitance forming sections 39 are joined to at least either the plurality of source lead wires 34 or the plurality of common wire capacitance forming sections 38, the plurality of gate lead wire capacitance forming sections 39 are at the same potentials as the plurality of source lines 14. On the other hand, the plurality of gate lead wires 32 are at the same potentials as the plurality of gate lines 13. Accordingly, electrostatic capacitances are formed between the plurality of gate lead wire capacitance forming sections 39, which are at the same potentials as the plurality of source lines 14, and the plurality of gate lead wires 32, which are at the same potentials as the plurality of gate lines 13. As a result, a load that is applied to a source line 14 includes a parasitic capacitance that is formed between the source line 14 and the common electrode 20, a parasitic capacitance that is formed between the source line 14 and a gate line 13, an electrostatic capacitance that is formed between a common wire capacitance forming section 38 and the common wire 31, and an electrostatic capacitance that is formed between a gate lead wire capacitance forming section 39 and a gate lead wire 32. Accordingly, differences among loads that are applied to the plurality of source lines 14 can be reduced by adjusting electrostatic capacitances that are formed between the plurality of common wire capacitance forming section 38 and the common wire 31 and adjusting electrostatic capacitances that are formed between the plurality of gate lead wire capacitance forming sections 39 and the gate lead wires 32. This reduces deterioration in display quality due to differences among loads. Moreover, since the gate lead wire capacitance forming sections 39 are joined to at least either the source lead wires 34 or the common wire capacitance forming sections 38, the gate lead wire capacitance forming sections 39 are high in connection reliability and need no special connecting structures for at least either the source lead wires 34 or the common wire capacitance forming sections 38.

Further, the capacitance forming sections 37 include a plurality of common electrode capacitance forming sections 40 disposed to overlap the common electrode 20 via the second interlayer insulating film (insulating film) 29 in the area outside the display area AA. In this way, differences among loads that are applied to the plurality of source lines 14 can be reduced by the formation of electrostatic capacitances between the plurality of common electrode capacitance forming sections 40 and the common electrode 20.

Further, the capacitance forming sections 37 include a plurality of common wire capacitance forming sections 38 joined to the plurality of source lead wires 34 and disposed to overlap the common wire 31 via the gate insulating film (insulating film) 23, and the plurality of common electrode capacitance forming sections 40 are connected to the plurality of common wire capacitance forming sections 38. In this way, differences among loads that are applied to the plurality of source lines 14 can be reduced by the formation of electrostatic capacitances between the plurality of common wire capacitance forming sections 38, which are joined to the plurality of source lead wires 34, and the common wire 31. Since the plurality of common electrode capacitance forming sections 40 are connected to the plurality of common wire capacitance forming sections 38, which are joined to the plurality of source lead wires 34, higher connection reliability is achieved than in the case of a plurality of common electrode capacitance forming sections directly connected to the plurality of source lead wires 34.

Further, the common electrode capacitance forming sections 40 include first overlap sections 40A disposed to overlap the common wire capacitance forming sections 38 via a first interlayer insulating film (insulating film) 26 and a planarizing film (insulating film) 27. In this way, space for placement can be reduced as much as the first overlap sections 40A are disposed to overlap the common wire capacitance forming sections 38 via the first interlayer insulating film 26 and the planarizing film 27, as compared with a case where common electrode capacitance forming sections and common wire capacitance forming sections are disposed not to overlap each other. This is suitable to achieving a narrower frame.

Further, the liquid crystal panel 10 further includes gate lines 13 disposed to extend along the row-wise direction in the display area AA and intersect the source lines 14 via the gate insulating film (insulating film) 23 and gate lead wires 32 drawn from the gate lines 13 into the area outside the display area AA and disposed to intersect the plurality of source lead wires 34 via the gate insulating film (insulating film) 23, and the common electrode capacitance forming sections 40 have second overlap sections 40B disposed to overlap the gate lead wires 32 via the gate insulating film (insulating film) 23, the first interlayer insulating film (insulating film) 26, and the planarizing film (insulating film) 27. In this way, since the common electrode capacitance forming sections 40 have, in addition to the first overlap sections 40A, which overlap the common wire capacitance forming sections 38, the second overlap sections 40B, which are disposed to overlap the gate lead wires 32 via the gate insulating film 23, the first interlayer insulating film 26, and the planarizing film 27, the common electrode capacitance forming sections 40 are larger in area than common electrode capacitance forming sections having only first overlap sections 40A. Accordingly, electrostatic capacitances that are formed between the common electrode capacitance forming sections 40 and the common electrode 20 can be increased. This makes it possible to more easily reduce differences among loads that are applied to the plurality of source lines 14, reducing deterioration in display quality due to differences among loads. Since the second overlap sections 40B of the common electrode capacitance forming sections 40 are placed in the space for placement of the gate lead wires 32, the space for placement can be reduced, as compared with the case of common electrode capacitance forming sections disposed not to overlap the gate lead wires 32. This is suitable to achieving a narrower frame.

Further, the liquid crystal panel 10 further includes a driver (signal supply unit) 11 that supplies a plurality of the image signals in a time-division manner, an image signal supply wire 17 connected to the driver 11, and a switch circuit 35, connected to the image signal supply wire 17 and the plurality of source lead wires 34, that sorts the plurality of image signals to the plurality of source lines 14. In this way, the plurality of image signals are sorted to the plurality of source lines 14 by the switch circuit 35 being driven in synchronization with the time-division supply of the plurality of image signals from the driver 11 to the image signal supply wire 17. The number of image signal supply wires 17 provided is smaller than each of the numbers of source lines 14 and source lead wires 34 provided as much as the plurality of image signals are supplied by the driver 11 in a time-division manner. Accordingly, the image signal supply wire 17, which is routed from the driver 11 to the switch circuit 35, can be placed in a small space. This is suitable to achieving a narrower frame.

Further, the common electrode capacitance forming sections 40 include the same first transparent electrode film (conducting film) 28 as the pixel electrodes 19. In this way, the number of films can be made smaller than in the case of common electrode capacitance forming section composed of a conducting film which is different from that which the pixel electrodes 19 are composed of. Further, since the second interlayer insulating film (insulating film) 29, which is sandwiched between the pixel electrodes 19 and the common electrode 20, is set to such a film thickness that a sufficiently high-intensity electric field is generated between the pixel electrodes 19 and the common electrode 20, sufficiently large electrostatic capacitances are formed between the common electrode capacitance forming sections 40 and the common electrode 20. This makes it possible to more easily reduce differences among loads that are applied to the plurality of source lines 14.

Further, the plurality of source lines 14 and the plurality of common wire capacitance forming sections 38 are disposed at a higher layer than the common wire 31 via the gate insulating film (insulating film) 23, the common electrode capacitance forming sections 40 and the pixel electrodes 19 are disposed at a higher layer than the plurality of source lines 14 and the plurality of common wire capacitance forming sections 38 via the first interlayer insulating film (insulating film) and the planarizing film (insulating film) 27, and the common electrode 20 is disposed at a higher layer than the common electrode capacitance forming sections 40 and the pixel electrodes 19 via the second interlayer insulating film (insulating film) 29. In this way, electrostatic capacitances are formed between the common wire 31 and the common wire capacitance forming sections 38, which are disposed at a higher layer than the common wire 31 to overlap the common wire 31 via the gate insulating film 23, and electrostatic capacitances are formed between the common electrode 20 and the common electrode capacitance forming sections 40, which are disposed at a lower layer than the common electrode 20 to overlap the common electrode 20 via the second interlayer insulating film 29. Since neither the common wire 31 nor the common electrode 20 is sandwiched between the common wire capacitance forming sections 38 and the common electrode capacitance forming sections 40, there is no need to form openings in the common wire 31 or the common electrode 20 in connecting the common wire capacitance forming sections 38 and the common electrode capacitance forming sections 40 to each other. This makes it hard for the common electrode capacitance forming sections 40, which are disposed at a higher layer than the common wire capacitance forming sections 38, to be short-circuited with the common wire 31 or the common electrode 20.

Further, the liquid crystal panel 10 further includes gate lines 13 disposed to extend along the row-wise direction in the display area AA and intersect the source lines 14 via the gate insulating film (insulating film) 23 and gate lead wires 32 drawn from the gate lines 13 into the area outside the display area AA, and the common wire 31 includes main wiring components 31A constituted by the same first metal film (conducting film) 22 as the gate lines 13 and the gate lead wires 32 and disposed to intersect the source lead wires 34 and the common wire capacitance forming sections 38 via the gate insulating film (insulating film) 23 and gate lead wire intersections (scanning lead wire intersections) 31B constituted by the same second metal film (conducting film) 25 as the source lead wires 34 and the common wire capacitance forming sections 38 and disposed to intersect the gate lead wires 32 via the gate insulating film (insulating film) 23. In this way, the gate lead wire intersections 31B, which are constituted by the same second metal film 25 as the source lead wires 34 and the common wire capacitance forming sections 38, are disposed to intersect the gate lead wires 32, and the main wiring components 31A, which are constituted by the same first metal film 22 as the gate lines 13 and the gate lead wires 32, are prevented from intersecting the gate lead wires 32. This makes it possible to prevent the common wire 31 and the gate lead wires 32 from being short-circuited with each other. In setting ranges of formation of the common wire capacitance forming sections 38, it is necessary to give consideration so that the common wire capacitance forming sections 38 are not short-circuited with the gate lead wire intersections 31B, as the common wire capacitance forming sections 38 are constituted by the same second metal film 25 as the gate lead wire intersections 31B. On the other hand, the common electrode capacitance forming sections 40 include the same first transparent electrode film 28 as the pixel electrodes 19, and are located at a different layer from any of the gate lead wires 32, the source lead wires 34, the common wire capacitance forming sections 38, the main wiring components 31A, and the gate lead wire intersections 31B. Accordingly, in setting ranges of formation of the common electrode capacitance forming sections 40, it is not necessary to give consideration so that the common electrode capacitance forming sections 40 are not short-circuited with the gate lead wires 32, the source lead wires 34, the common wire capacitance forming sections 38, the main wiring components 31A, or the gate lead wire intersections 31B. This gives a high degree of freedom in the setting of the ranges of formation.

Further, the plurality of capacitance forming sections 37 are configured to become smaller in area of overlap with at least either the common electrode 20 or the common wire 31 as the source lines 14 to which the plurality of capacitance forming sections 37 are connected via the source lead wires 34 become larger in length. The plurality of source lines 14 tend to form larger parasitic capacitances with the common electrode 20 as they become larger in length. On the other hand, the plurality of capacitance forming sections 37 tend to form smaller electrostatic capacitances with at least either the common electrode 20 or the common wire 31 as the plurality of capacitance forming sections 37 become smaller in area of overlap with at least either the common electrode 20 or the common wire 31. Accordingly, since, as stated above, the plurality of capacitance forming sections 37 are configured to become smaller in area of overlap with at least either the common electrode 20 or the common wire 31 as the source lines 14 to which the plurality of capacitance forming sections 37 are connected via the source lead wires 34 become larger in length, a smaller electrostatic capacitance is formed by a capacitance forming section 37 connected via a source lead wire 34 to a source line 14 that tends to form a large parasitic capacitance with the common electrode 20, whereas a large electrostatic capacitance is formed by a capacitance forming section 37 connected via a source lead wire 34 to a source line 14 that tends to form a small parasitic capacitance with the common electrode 20. This makes it possible to suitably reduce differences among loads that are applied to the plurality of source lines 14, satisfactorily reducing deterioration in display quality. Further, this makes manufacturing easier than in the case of variations in film thickness of at least either a second interlayer insulating film or a gate insulating film sandwiched between the plurality of capacitance forming sections 37 and at least either the common electrode 20 or the common wire 31.

Embodiment 2

Embodiment 2 is described with reference to FIGS. 11 to 13. Embodiment 2 illustrates changes made to achieve ranges of formation of common electrode capacitance forming sections 140. It should be noted that a repeated description of structures, actions, and effects which are similar to those of Embodiment 1 described above is omitted.

Figure 11:
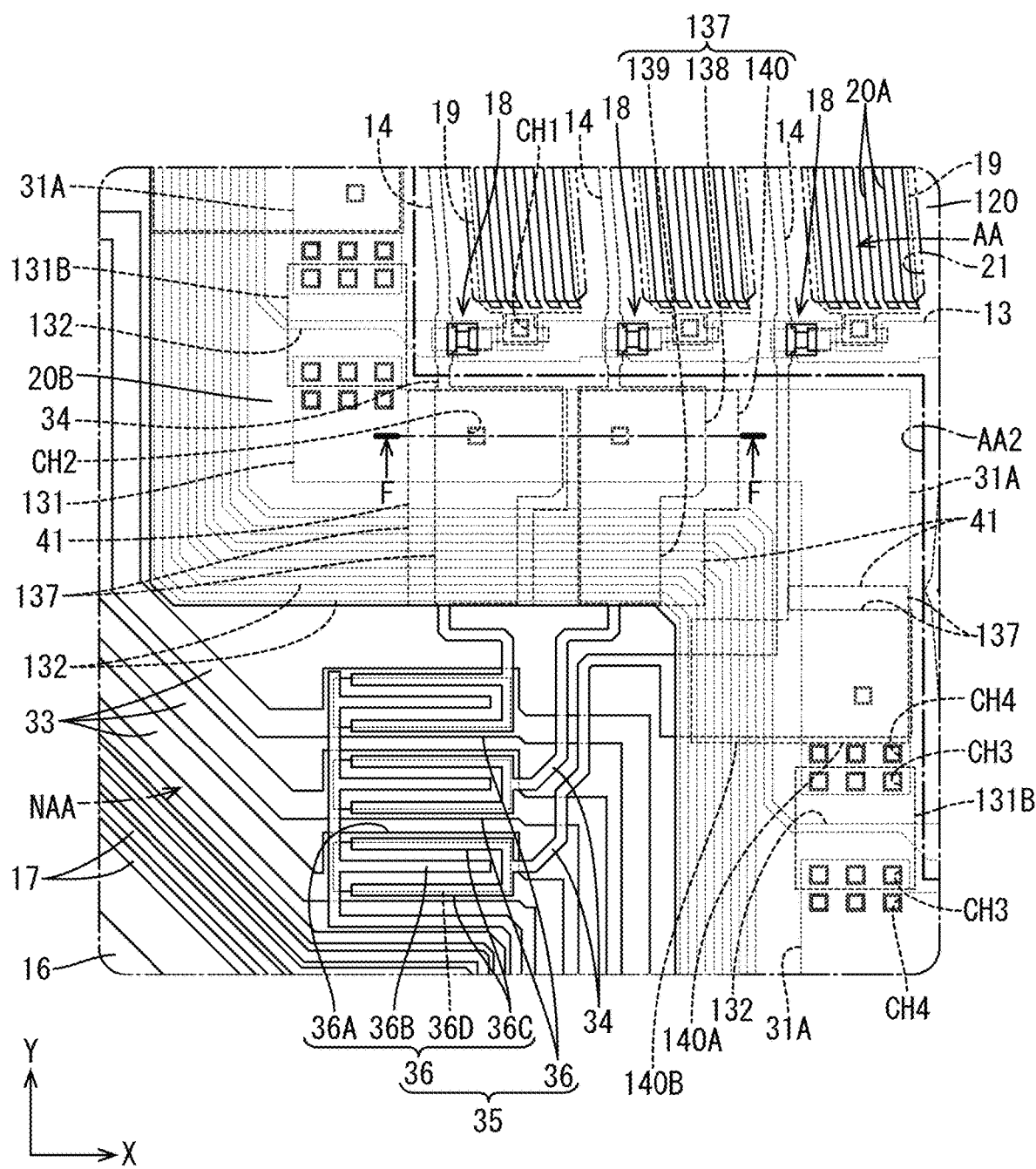
FIG. 11 is a plan view of an array substrate according to Embodiment 2 in and near a capacitance wire, source lead wires, and a switch circuit.
Figure 12:
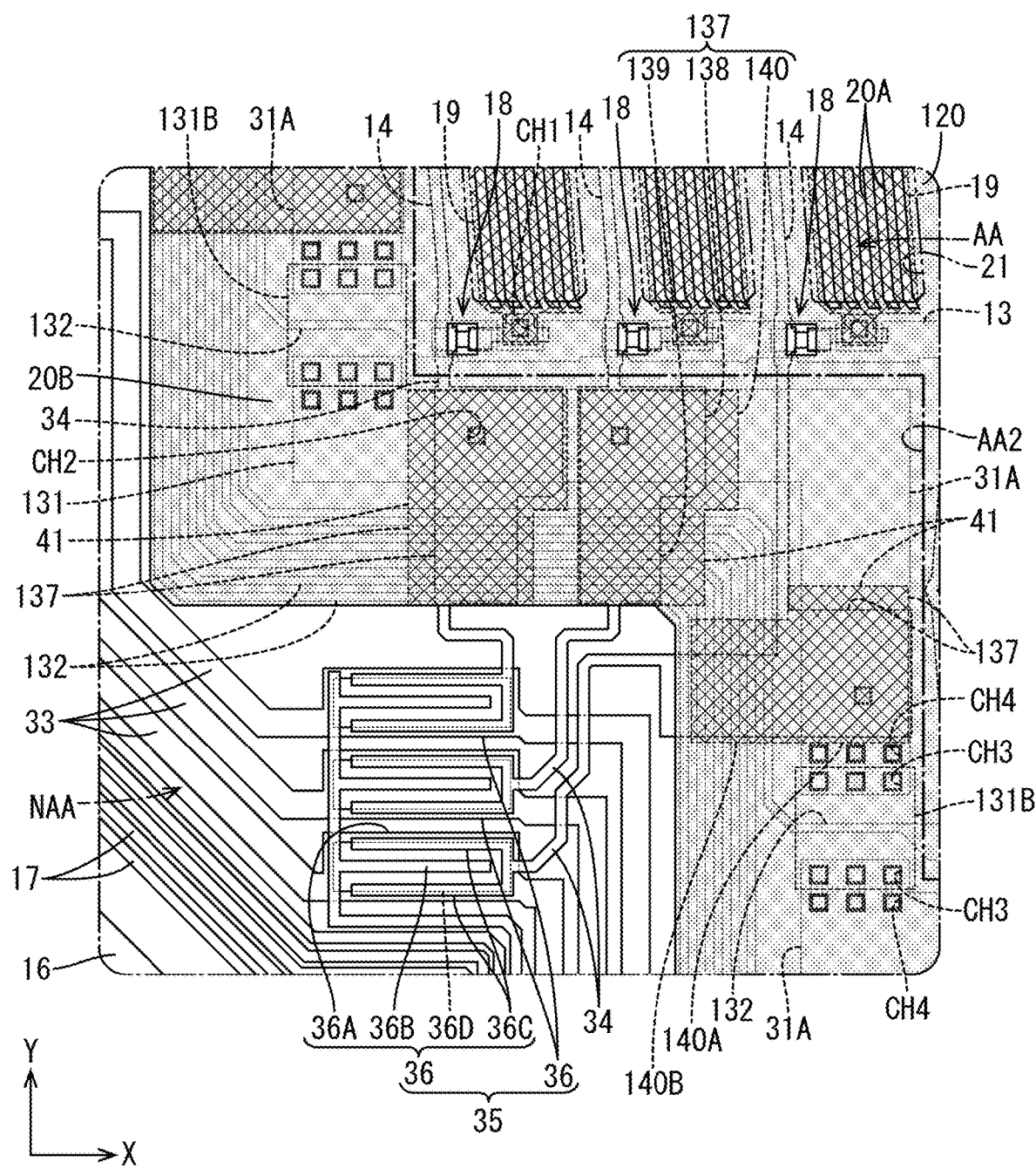
FIG. 12 is a plan view showing a configuration of components in and near the capacitance wire, the source lead wires, and the switch circuit in the array substrate with a focus on patterns of a first transparent electrode film and a second transparent electrode film.
Figure 13:
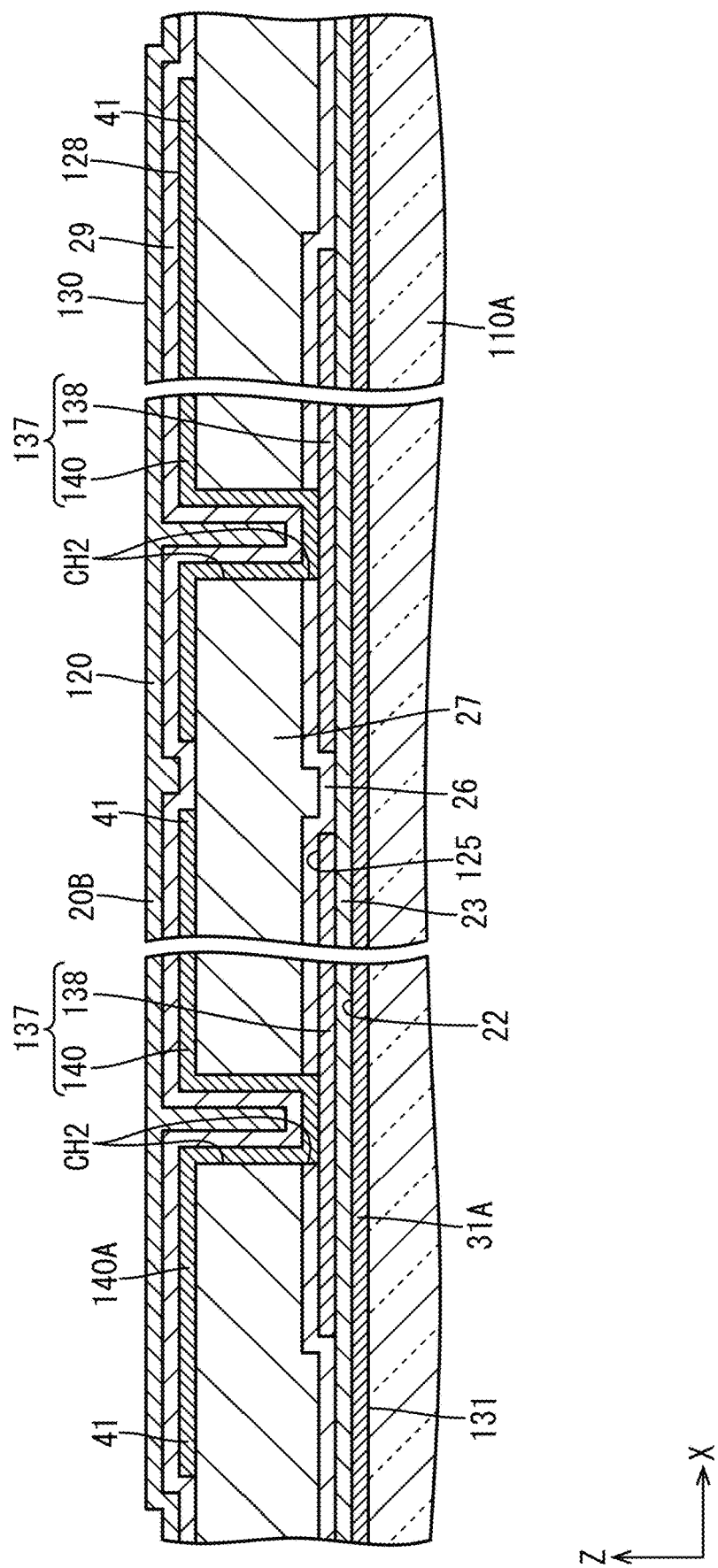
FIG. 13 is a cross-sectional view of the array substrate as taken along line F-F in FIG. 12.

As shown in FIGS. 11 to 13, the common electrode capacitance forming sections 140 are formed to be larger than common wire capacitance forming sections 138 when seen in plan view. FIG. 11 is an enlarged plan view of an array substrate 110A in and near an extended outer shape section. FIG. 12 is a plan view showing a configuration of components in and near the extended outer shape section with a focus on patterns of a first transparent electrode film 128 and a second transparent electrode film 130. FIG. 12 uses different types of half-tone dot meshing to illustrate the patterns of the first transparent electrode film 128 and the second transparent electrode film 130. FIG. 13 is a cross-sectional view of the array substrate 110A as formed by cutting through a capacitance forming section 137 (i.e. a cross-sectional view taken along line F-F in FIG. 12). In particular, each of the common electrode capacitance forming sections 140 has a first overlap section 140A overlapping a common wire capacitance forming section 138, a second overlap section 140B overlapping a gate lead wire capacitance forming section 139, and an extended capacitance forming section 41 extended to not to overlap the common wire capacitance forming section 138 and the gate lead wire capacitance forming section 139. The extended capacitance forming section 41 is formed by extending the first overlap section 140A and the second overlap section 140B along a direction (i.e. the X-axis direction or the Y-axis direction) parallel with each of the lengths of a common wire 131 and gate lead wires 132, and a large portion of the extended capacitance forming section 41 is disposed to overlap the common wire 131 and the gate lead wires 132. With such a configuration, the area of overlap between the common electrode capacitance forming section 140 and a common electrode 120 increases as much as the extended capacitance forming section 41 has been extended, so that a larger electrostatic capacitance is formed. Moreover, since the extended capacitance forming section 41 is disposed to overlap the common wire 131 and the gate lead wires 132, higher space efficiency is achieved. This is suitable to achieving a narrower frame. Furthermore, since the extended capacitance forming section 41 is an extension of the common electrode capacitance forming section 140, which is composed of the first transparent electrode film 128, it is not necessary to give consideration so that the extended capacitance forming section 41 is not short-circuited with a gate lead wire intersection 131B composed of a second metal film 125, as compared with the case of an extension of a common wire capacitance forming section composed of the second metal film 125. This makes it possible to freely set the range of formation. This makes it easy to sufficiently increase the area of overlap between the common electrode capacitance forming section 140 and the common electrode 120.

As described above, according to the present embodiment, the common electrode capacitance forming sections 140 have extended capacitance forming sections 41 extended to overlap the common wire 131 but not to overlap the common wire capacitance forming sections 138. In this way, the area of overlap between the common electrode capacitance forming section 140 and a common electrode 120 increases as much as the extended capacitance forming section 41 has been extended, so that a larger electrostatic capacitance is formed. Moreover, since the extended capacitance forming section 41 is disposed to overlap the common wire 131, higher space efficiency is achieved. This is suitable to achieving a narrower frame.

Embodiment 3

Embodiment 3 is described with reference to FIG. 14 or 15. Embodiment 3 illustrates changes made to Embodiment 1 described above to achieve ranges of formation of a common electrode 220 and common electrode capacitance forming sections 240. It should be noted that a repeated description of structures, actions, and effects which are similar to those of Embodiment 1 described above is omitted.

Figure 14:
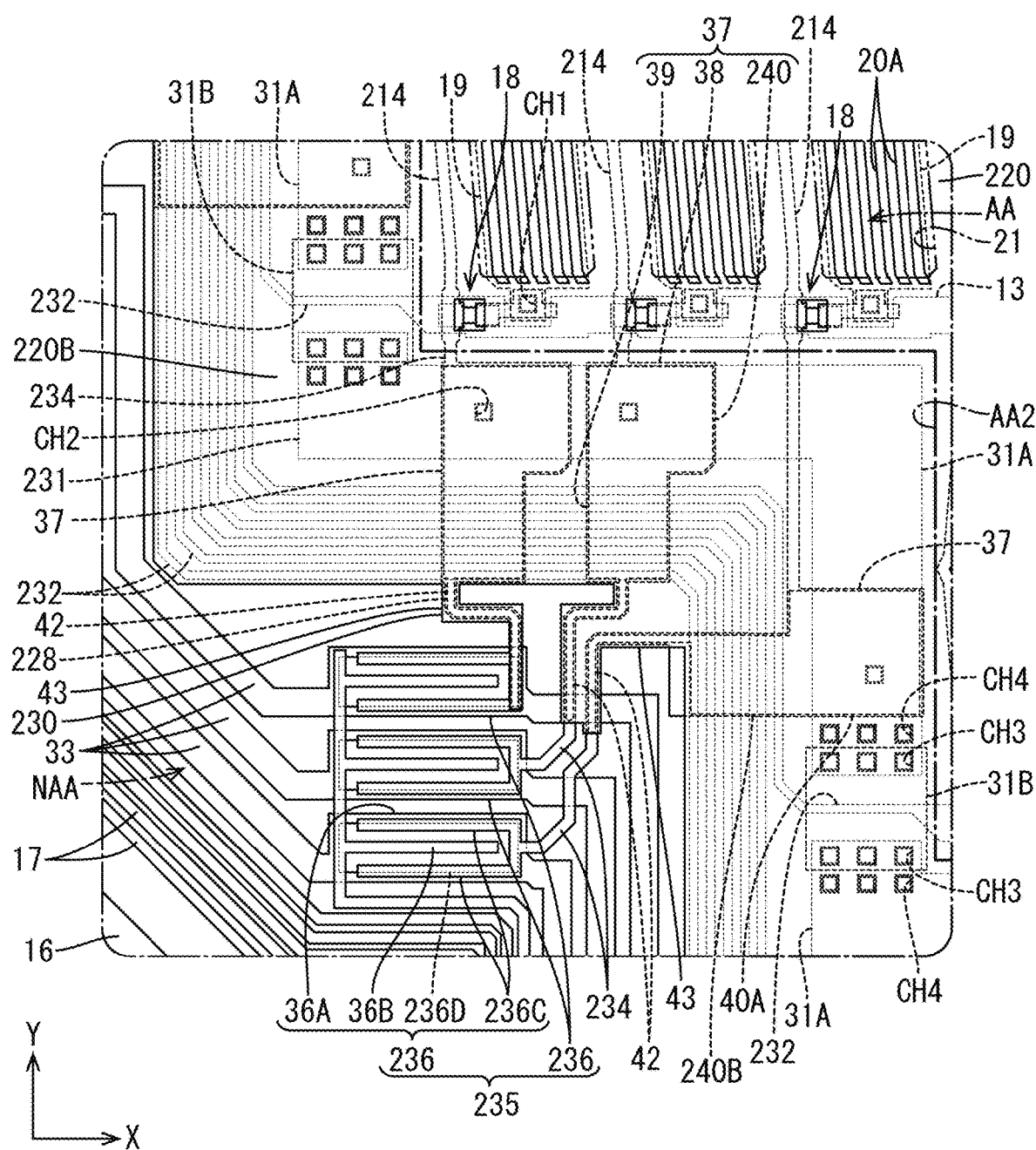
FIG. 14 is a plan view of an array substrate according to Embodiment 3 in and near a capacitance wire, source lead wires, and a switch circuit.
Figure 15:
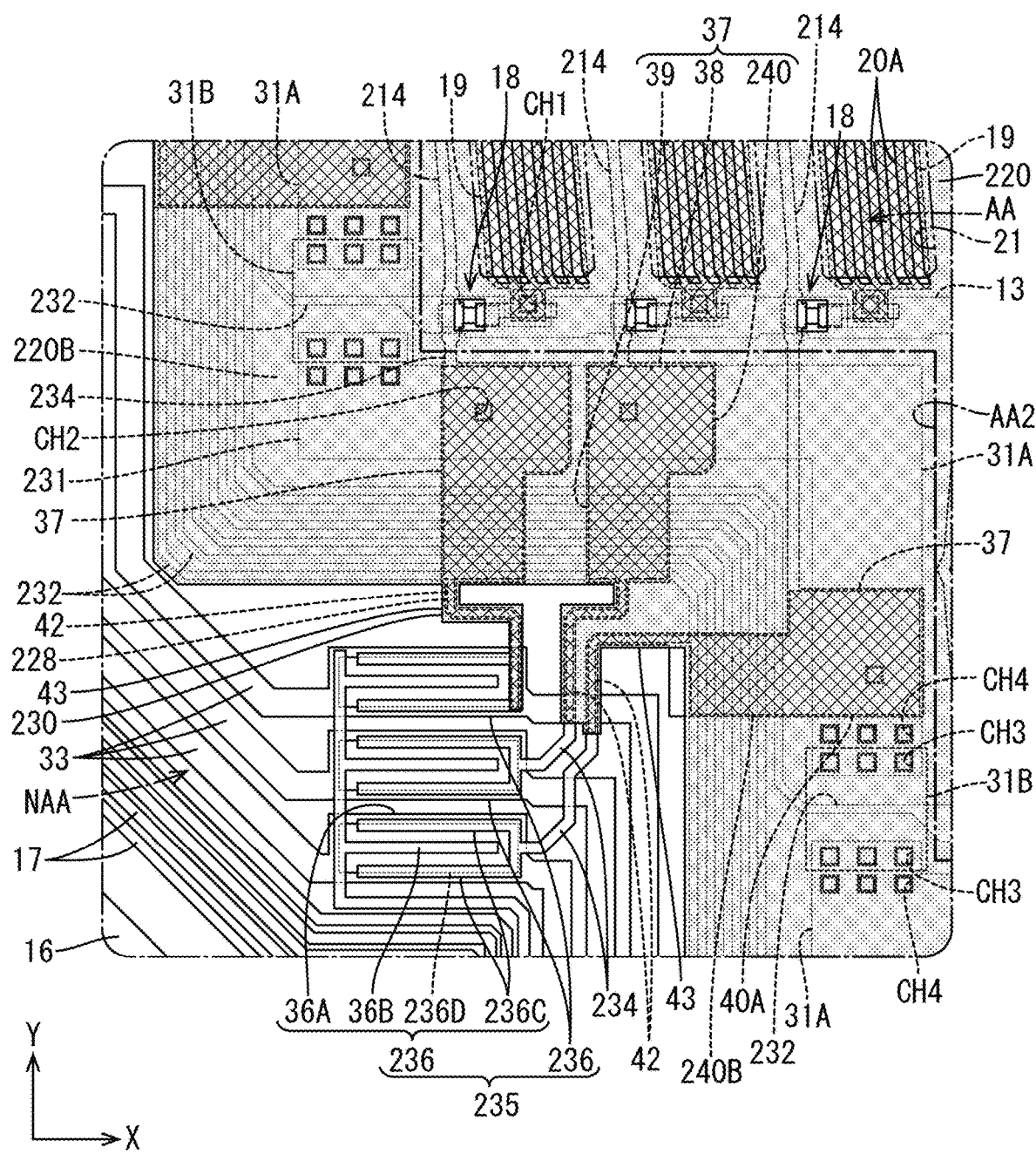
FIG. 15 is a plan view showing a configuration of components in and near the capacitance wire, the source lead wires, and the switch circuit in the array substrate with a focus on patterns of a first transparent electrode film and a second transparent electrode film.

As shown in FIGS. 14 and 15, the common electrode 220 and the common electrode capacitance forming sections 240 according to the present embodiment are each formed to be extended closer to a switch circuit 235 than gate lead wires 232. FIG. 14 is an enlarged plan view of a configuration of components in and near an extended outer shape section of an array substrate. FIG. 15 is a plan view showing a configuration of components in and near the extended outer shape section of the array substrate with a focus on patterns of a first transparent electrode film 228 and a second transparent electrode film 230. FIG. 15 uses different types of half-tone dot meshing to illustrate the patterns of the first transparent electrode film 228 and the second transparent electrode film 230. Each of the common electrode capacitance forming sections 240 has a third overlap section 42 disposed to overlap, via a second interlayer insulating film and a planarizing film, a portion of a source lead wire 234 located closer to the switch circuit 235 than the gate lead wires 232. The third overlap section 42 extends in parallel with a portion of the source lead wire 234 that is routed from a location of intersection with the outermost gate lead wire 232 to a drain electrode 236C of a switch transistor 236 of the switch circuit 235, and has substantially the same width dimension as the line width of the source lead wire 234 over the entire length. The third overlap section 42 is directly joined to a second overlap section 240B disposed to overlap the gate lead wires 232. An outside-the-display-area common electrode section 220B of the common electrode 220 has an extended common electrode section 43 disposed to overlap the above third overlap section 42 via the second interlayer insulating film. The extended common electrode section 43 is substantially the same in length dimension as the third overlap section 42 but is slightly larger in width dimension than the third overlap section 42. With such a configuration, an electrostatic capacitance is formed between the third overlap section 42 and the extended common electrode section 43, which are disposed to overlap each other via the second interlayer insulating film. This causes larger electrostatic capacitances to be formed between the common electrode capacitance forming sections 240 and the common electrode 220, thus making it possible to more easily reduce differences among loads that are applied to a plurality of source lines 214. Moreover, since the third overlap section 42 and the extended common electrode section 43 are disposed not to overlap a channel section 236D of the switch transistor 236, it is possible to make it hard for an off-leak current to be generated in the switch transistor 236 due to an electric field that is generated from the third overlap section 42 and the extended common electrode section 43. Further, since the third overlap section 42 of the common electrode capacitance forming section 240 is placed in the space for placement of the source lead wire 234, the space for placement can be reduced, as compared with the case of a common electrode capacitance forming section disposed not to overlap the source lead wire 234. This is suitable to achieving a narrower frame.

As described above, according to the present embodiment, the switch circuit 235 is disposed so that at least the common wire 231 and the gate lead wires 232 are interposed between the switch circuit 235 and the display area AA, the common electrode capacitance forming sections 240 have third overlap sections 42 disposed to overlap, via a first interlayer insulating film (insulating film) and a planarizing film (insulating film), portions of the source lead wires 234 located closer to the switch circuit 235 than the gate lead wires 232, and the common electrode 220 has an extended common electrode section 43 disposed to overlap the third overlap sections 42 via a second interlayer insulating film (insulating film). In this way, since the common electrode capacitance forming sections 240 have the third overlap sections 42 disposed to overlap, via the first interlayer insulating film and the planarizing film, the portions of the source lead wires 234 located closer to the switch circuit 235 than the gate lead wires 232 and the common electrode 220 has the extended common electrode section 43 disposed to overlap the third overlap sections 42 via the second interlayer insulating film, electrostatic capacitances are formed between the third overlap sections 42 and the extended common electrode section 43. This causes larger electrostatic capacitances to be formed between the common electrode capacitance forming sections 240 and the common electrode 220 in the space for placement of the source lead wire 234, thus making it possible to, while achieving a narrower frame, more easily reduce differences among loads that are applied to the plurality of source lines 214.

Embodiment 4

Embodiment 4 is described with reference to FIGS. 16 to 20. In Embodiment 4 illustrated here, pixel electrodes 319 and a common electrode 320 are stacked in an order opposite to the order in which their counterparts are stacked in Embodiment 1 described above. It should be noted that a repeated description of structures, actions, and effects which are similar to those of Embodiment 1 described above is omitted.

Figure 16:
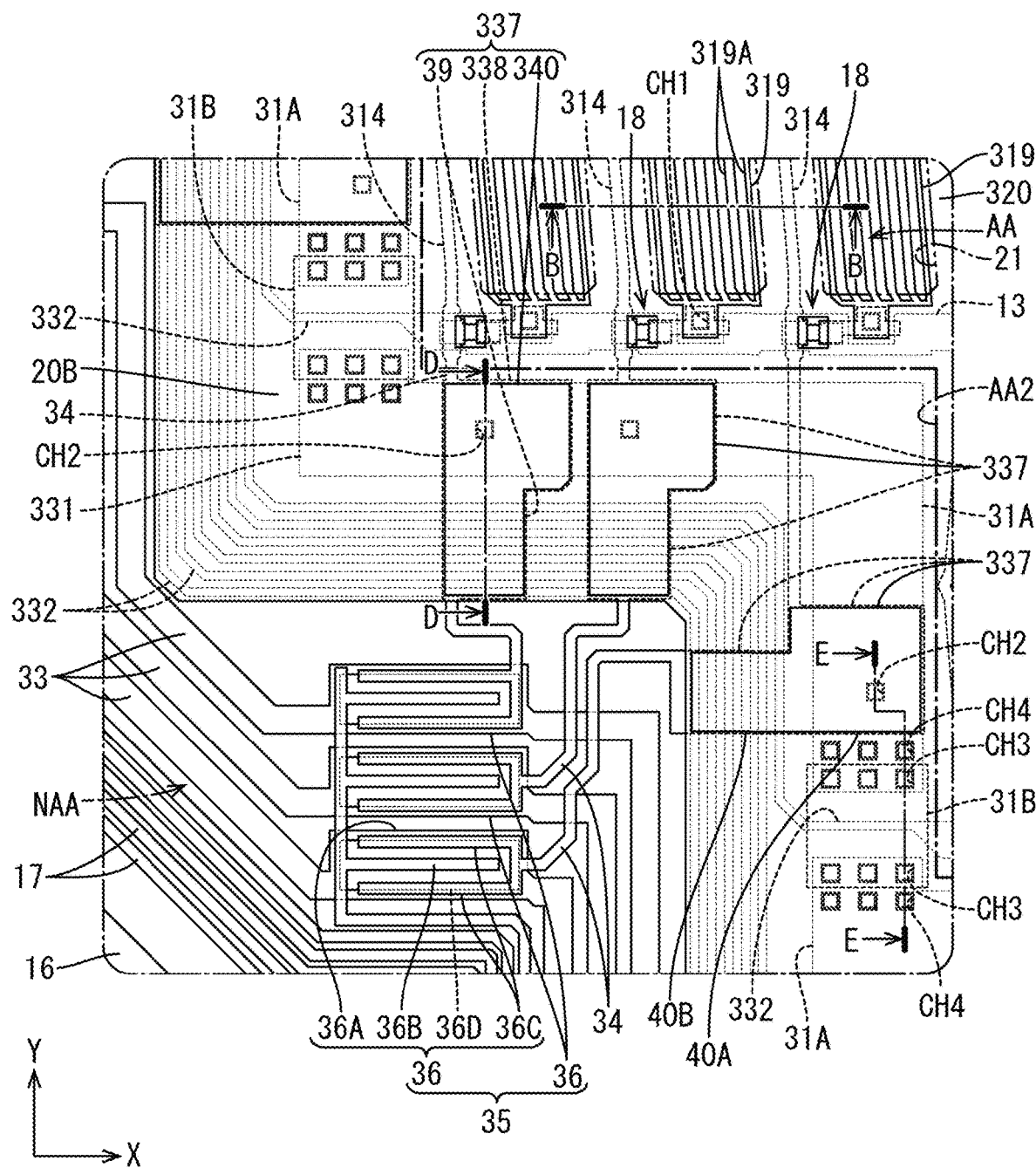
FIG. 16 is a plan view of an array substrate according to Embodiment 4 in and near a capacitance wire, source lead wires, and a switch circuit.
Figure 17:
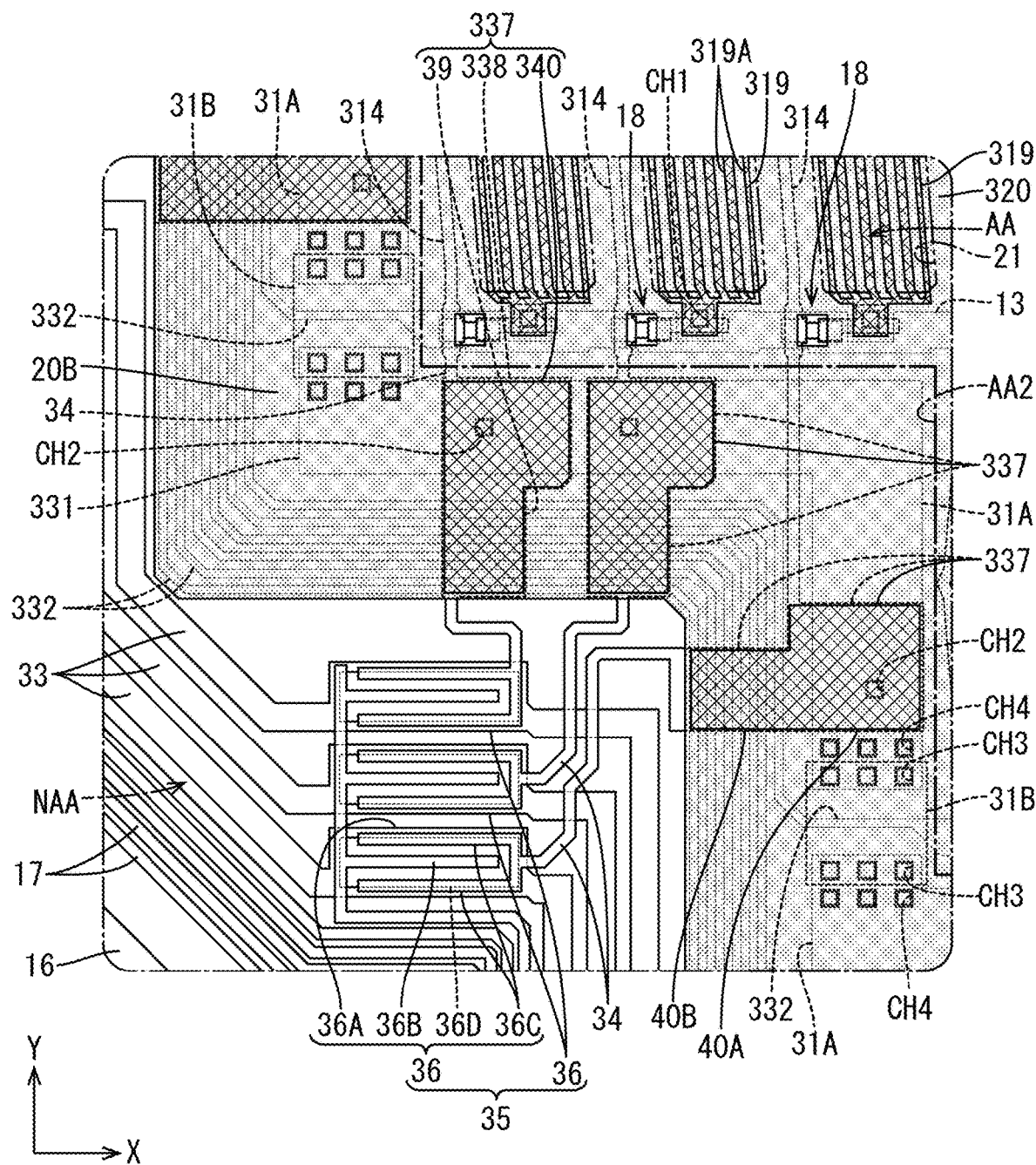
FIG. 17 is a plan view showing a configuration of components in and near the capacitance wire, the source lead wires, and the switch circuit in the array substrate with a focus on patterns of a first transparent electrode film and a second transparent electrode film.
Figure 18:
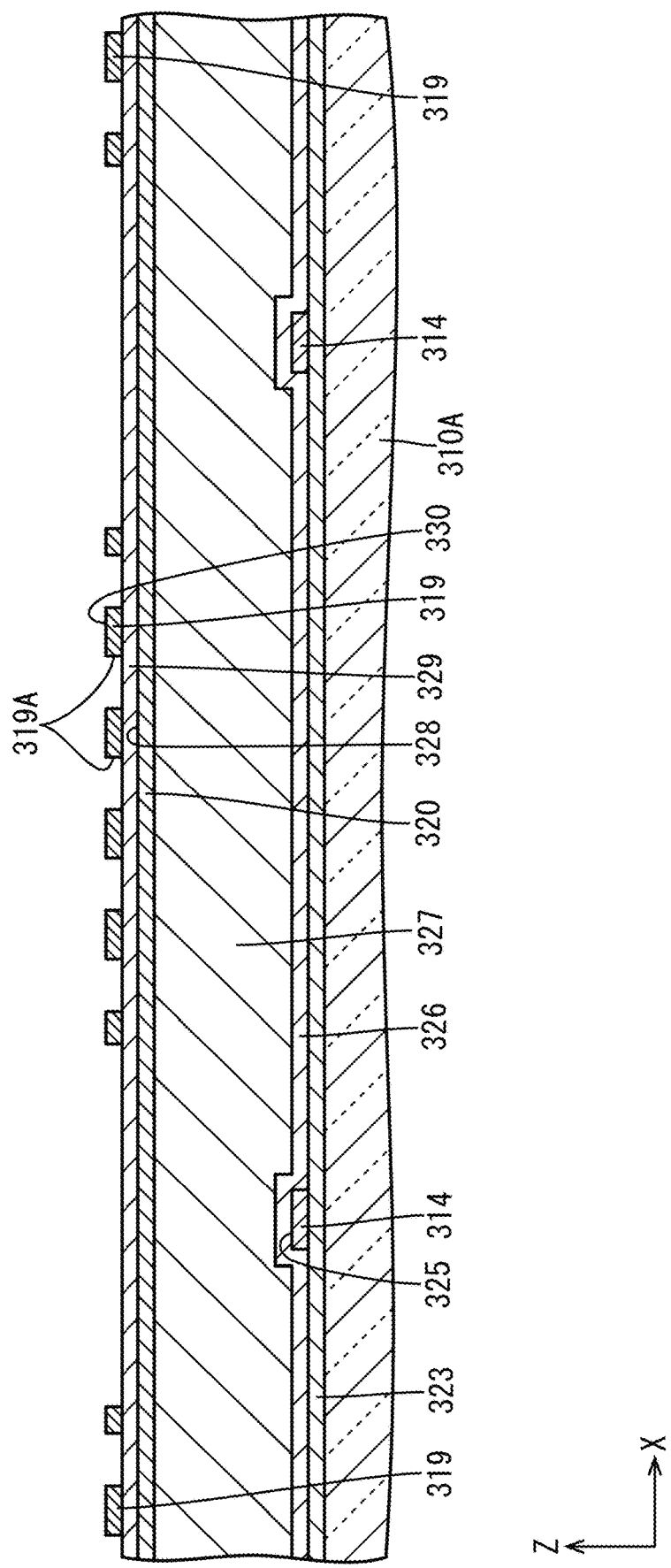
FIG. 18 is a cross-sectional view of the array substrate as taken along line B-B in FIG. 16.

As shown in FIGS. 16 to 18, the pixel electrodes 319 according to the present embodiment are composed of a second transparent electrode film 330, whereas the common electrode 320 is composed of a first transparent electrode film 328. FIG. 16 is an enlarged plan view of a configuration of components in and near an extended outer shape section of an array substrate 310A. FIG. 17 is a plan view showing a configuration of components in and near the extended outer shape section of the array substrate 310A with a focus on patterns of the first transparent electrode film 328 and the second transparent electrode film 330. FIG. 17 uses different types of half-tone dot meshing to illustrate the patterns of the first transparent electrode film 328 and the second transparent electrode film 330. FIG. 18 is a cross-sectional view of the array substrate 310A in and near source lines 314 and pixel electrodes 319 (i.e. a cross-sectional view taken along line B-B in FIG. 16). Each of the pixel electrodes 319, which are located closer to the liquid crystal layer than the common electrode 320, has bored therethrough a plurality of common electrode overlap openings 319A extending along a direction parallel with the length of the pixel electrode 319. Accordingly, the common electrode 320 is configured not to have the pixel electrode overlap openings 20A (see FIG. 5) described above in Embodiment 1.

Figure 19:
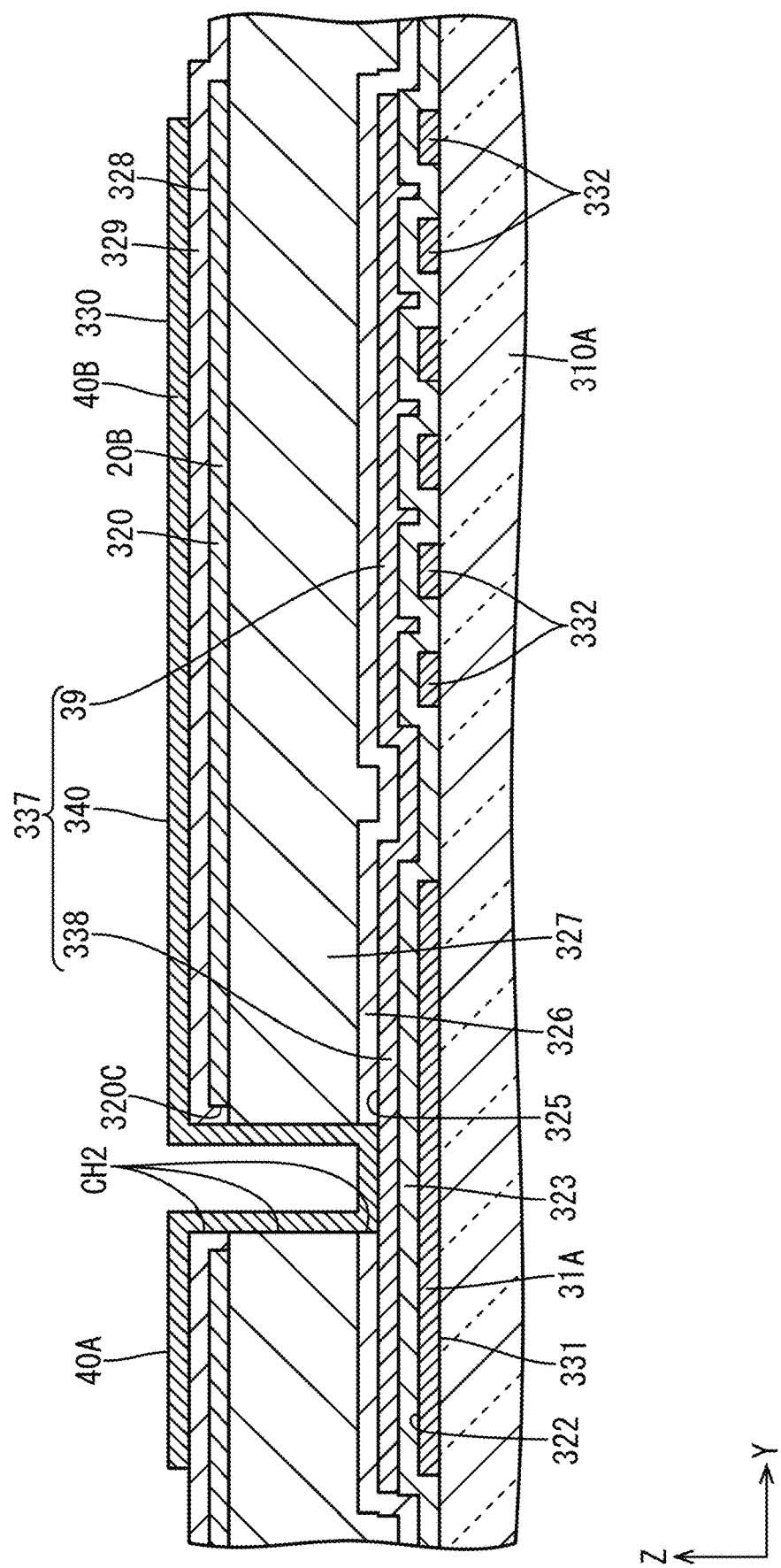
FIG. 19 is a cross-sectional view of the array substrate as taken along line D-D in FIG. 16.
Figure 20:
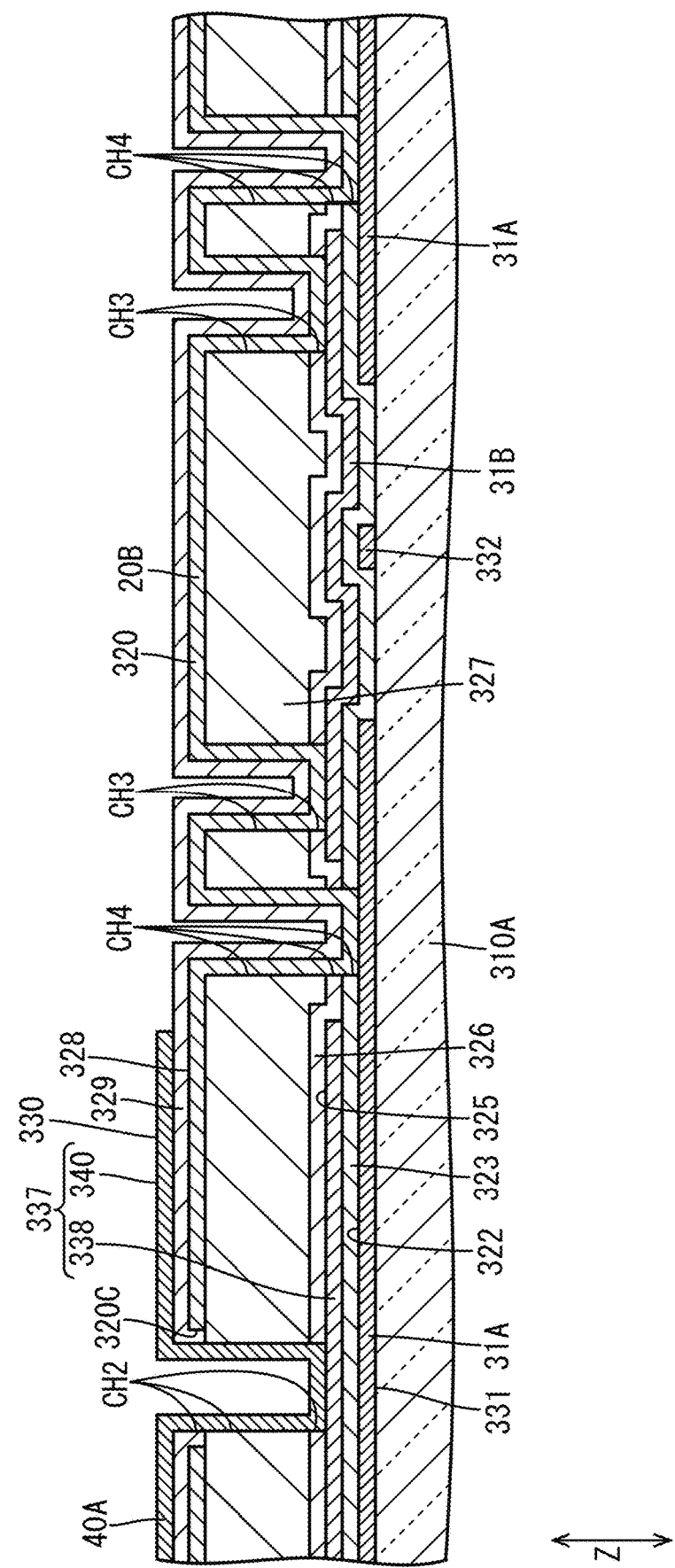
FIG. 20 is a cross-sectional view of the array substrate as taken along line E-E in FIG. 16.

Next, a capacitance forming section 337 is described with reference to FIGS. 19 and 20. FIG. 19 is a cross-sectional view of the array substrate 310A as formed by cutting through the vicinity of a common wire 331, gate lead wires 332, and a capacitance forming section 337 (i.e. a cross-sectional view taken along line D-D in FIG. 16). FIG. 20 is a cross-sectional view of the array substrate 310A as formed by cutting through the vicinity of the common wire 331 and a capacitance forming section 337 (i.e. a cross-sectional view taken along line E-E in FIG. 16). Each of the capacitance forming sections 337 is constituted by a common wire capacitance forming section 338 composed of a second metal film 325. As shown in FIGS. 19 and 20, the common wire capacitance forming section 338 forms an electrostatic capacitance with the common wire 331, which is composed of a first metal film 322, by being disposed to overlap the common wire 331 with a gate insulating film 323 sandwiched therebetween. On the other hand, a common electrode capacitance forming section 340 is composed of the same second transparent electrode film 330 as the pixel electrode 319, and is disposed at a higher layer than the common electrode 320 to overlap the common electrode 320, which is composed of the first transparent electrode film 328, via the second interlayer insulating film 329. Accordingly, the common electrode capacitance forming section 340 forms an electrostatic capacitance with the common electrode 320, which is disposed at a lower layer than the common electrode capacitance forming section 340 to overlap the common electrode capacitance forming section 340 via the second interlayer insulating film 329. Moreover, since the common electrode 320, which is composed of the first transparent electrode film 328, is disposed at a higher layer than the common wire capacitance forming section 338, which is composed of the second metal film 325, to overlap the common wire capacitance forming section 338 via a first interlayer insulating film 326 and a planarizing film 327 with no common electrode capacitance forming section 40 sandwiched as in the case of Embodiment 1 described above (see FIGS. 9 and 10), an electrostatic capacitance is formed between the common wire capacitance forming section 338 and the common electrode 320, too. This makes it possible to more easily reduce differences among loads that are applied to the plurality of source lines 314. In the present embodiment, the pixel contact holes CH1 are bored through the first interlayer insulating film 326, the planarizing film 327, and the second interlayer insulating film 329, the inter-capacitance-forming-section contact holes CH2 are bored through the first interlayer insulating film 326, the planarizing film 327, and the second interlayer insulating film 329, the first common wire contact holes CH3 are bored through the first interlayer insulating film 326 and the planarizing film 327, and the second common wire contact holes CH4 are bored through the gate insulating film 323, the first interlayer insulating film 326, and the planarizing film 327. Further, the common electrode 320 has openings 320C formed in areas surrounding the inter-capacitance-forming-section contact holes CH2.

As described above, according to the present embodiment, the plurality of source lines 314 and the plurality of common wire capacitance forming sections 338 are disposed at a higher layer than the common wire 331 via the gate insulating film (insulating film) 323, the common electrode 320 is disposed at a higher layer than the plurality of source lines 314 and the common wire capacitance forming sections 338 via a first interlayer insulating film (insulating film) 326 and a planarizing film (insulating film) 327, and the common electrode capacitance forming sections 340 and the pixel electrodes 319 are disposed at a higher layer than the common electrode 320 via a second interlayer insulating film (insulating film) 329. In this way, electrostatic capacitances are formed between the common wire 331 and the common wire capacitance forming sections 338, which are disposed at a higher layer than the common wire 331 to overlap the common wire 331 via the gate insulating film 323, and electrostatic capacitances are formed between the common electrode 320 and the common electrode capacitance forming sections 340, which are disposed at a higher layer than the common electrode 320 to overlap the common electrode 320 via the second interlayer insulating film 329. Since the common electrode 320 is disposed at a higher layer than the common wire capacitance forming sections 338 to overlap the common wire capacitance forming sections 338 via the first interlayer insulating film 326 and the planarizing film 327, electrostatic capacitances are formed between the common wire capacitance forming sections 338 and the common electrode 320, too. This makes it possible to more easily reduce differences among loads that are applied to the plurality of source lines 314.

Other Embodiments

The technology disclosed herein is not limited to the embodiments described with reference to the foregoing description and drawings. For example, embodiments such as those listed below are encompassed in the technical scope.

(1) The areas of overlap of the plurality of capacitance forming sections 37, 137, or 337 with the common electrode 20, 120, 220, or 320 and the common wire 31, 131, 231, or 331 may continuously gradationally vary or gradually sequentially vary with variations in length of the plurality of source lines 14, 21, or 314 connected via the plurality of source lead wires 34 or 234.

(2) The common electrode capacitance forming section 40, 140, 240, or 340 may be smaller in range of formation than the common wire capacitance forming section 38, 138, or 338 and the gate lead wire capacitance forming section 39 or 139 when seen in plan view. That is, the common electrode capacitance forming section 40, 140, 240, or 340 may overlap a part of the common wire capacitance forming section 38, 138, or 338 and a part of the gate lead wire capacitance forming section 39 or 139, and the common wire capacitance forming section 38, 138, or 338 and the gate lead wire capacitance forming section 39 or 139 may have portions that do not overlap the common electrode capacitance forming section 40, 140, 240, or 340.

(3) The common electrode capacitance forming section 40, 140, 240, or 340 may be disposed not to overlap either the common wire capacitance forming section 38, 138, or 338 or the gate lead wire capacitance forming section 39 or 139. That is, either the first overlap section 40A or 140A or the second overlap section 40B, 140B, or 240B may be omitted.

(4) The common wire capacitance forming section 38, 138, or 338, the gate lead wire capacitance forming section 39 or 139, and the common electrode capacitance forming section 40, 140, 240, or 340 may be equal in range of formation to one another when seen in plan view, or may be disposed to partially overlap one another and have portions that do not overlap one another. Further, the common wire capacitance forming section 38, 138, or 338, the gate lead wire capacitance forming section 39 or 139, and the common electrode capacitance forming section 40, 140, 240, or 340 may be disposed not to overlap one another.

(5) Any one or two of the common wire capacitance forming section 38, 138, or 338, the gate lead wire capacitance forming section 39 or 139, and the common electrode capacitance forming section 40, 140, 240, or 340 may be omitted.

(6) The common electrode capacitance forming section 40, 140, 240, or 340 may be directly connected to the source lead wire 34 or 234 without passing through the common wire capacitance forming section 38, 138, or 338.

(7) The gate lead wire capacitance forming section 39 or 139 may be formed to be joined to only either the source lead wire 34 or 234 or the common wire capacitance forming section 38, 138, or 338.

(8) Whereas the common wire capacitance forming section 38, 138, or 338 may be constituted by the first metal film 22 or 322, the main wiring components 31A of the common wire 31, 131, 231, or 331 may be constituted by the second metal film 25, 125, or 325. For example, a portion of the source lead wire 34 or 234 intersecting at least a main wiring component 31A may be constituted by the first metal film 22 or 322, and the common wire capacitance forming section 38, 138, or 338 may be formed in such a manner as to be joined to the portion.

(9) The common wire 31, 131, 231, or 331 may be configured such that sites of overlap between the main wiring components 31A and the gate lead wire intersections 31B or 131B are directly connected to each other through contact holes bored through the gate insulating film 23 or 323. In that case, either the first common wire contact holes CH3 or the second common wire contact holes CH4 may be omitted.

(10) The common wire 31, 131, 231, or 331 may be a single-layer structure constituted solely by the first metal film 22 or 322. In that case, when a portion of the gate lead wire 32, 132, 232, or 322 intersecting at least the common wire 31, 131, 231, or 331 is constituted by the second metal film 25, 125, or 325, a short-circuit between the gate lead wire 32, 132, 232, or 322 and the common wire 31, 131, 231, or 331 can be avoided.

(11) In a modification of Embodiments 1 to 3, the common electrode 20, 120, or 220, which is composed of the second transparent electrode film 30, 130, or 230, may be connected to the main wiring components 31A, which are composed of the first metal film 22, of the common wire 31, 131, or 231 via intermediate electrodes composed of the second metal film 25 or 125 or the first transparent electrode film 28, 128, or 228. Alternatively, the common electrode 20, 120, or 220, which is composed of the second transparent electrode film 30, 130, or 230, may be connected to the gate lead wire intersections 31B or 131B, which are composed of the second metal film 25 or 125, of the common wire 31, 131, or 231 via intermediate electrodes composed of the first transparent electrode film 28, 128, or 228.

(12) In a modification of Embodiment 4, the common electrode 320, which is composed of the first transparent electrode film 328, may be connected to the main wiring components 31A, which are composed of the first metal film 322, of the common wire 331 via intermediate electrodes composed of the second metal film 325.

(13) The outside-the-display area common electrode section 20B or 220B of the common electrode 20, 120, 220, or 320 may be formed to be extended further outward than the outermost gate lead wire 32, 132, 232, or 332. Even in that case, in terms of inhibiting the generation of an off-leak current, it is preferable, but is not necessary, that the outside-the-display area common electrode section 20B or 220B be disposed not to overlap the channel section 36D or 236D of the switch transistor 36 or 236 of the switch circuit 35 or 235.

(14) A plurality of source lines 14, 214, or 314 disposed in the non-rectangular display area AA2 do not need to all have different lengths, but may include a plurality of source lines 14, 214, or 314 of the same length.

(15) As a technique for adjusting an electrostatic capacitance that is formed between the common wire capacitance forming section 38, 138, or 338 and the common wire 31, 131, 231, or 331, the film thickness of a portion of the gate insulating film 23 or 323 sandwiched between the common wire capacitance forming section 38, 138, or 338 and the common wire 31, 131, 231, or 331 may be locally increased or decreased. Similarly, as a technique for adjusting an electrostatic capacitance that is formed between the common electrode capacitance forming section 40, 140, 240, or 340 and the common electrode 20, 120, 220, or 320, the film thickness of a portion of the second interlayer insulating film 29 or 329 sandwiched between the common electrode capacitance forming section 40, 140, 240, or 340 and the common electrode 20, 120, 220, or 320 may be locally increased or decreased.

(16) The switch circuit 35 or 235 may be omitted. In that case, the image signal supply wire 17 is directly connected to the source lead wire 34 or 234, so that the numbers of image signal supply wires 17 and source lead wires 34 or 234 provided are equal.

(17) The driver 11 may be mounted by COF (chip on film) on a flexible substrate 12 that is mounted by FOG (film on glass) on the array substrate 10A, 110A, or 310A. In that case, the image signal supply wires 17 are connected to terminal areas that are disposed in a mounting area of the array substrate 10A, 110A, or 310A for the flexible substrate 12 and that are connected to the flexible substrate 12.

(18) The outer shape of the liquid crystal panel 10 and the outer shape of the display area AA do not need to be similar to each other.

(19) An extended outer shape section 10EX may be provided only on one side of the liquid crystal panel 10 in the X-axis direction. In that case, extended outer shape sections 10EX may be provided on both sides, respectively, of the liquid crystal panel 10 in the Y-axis direction, or an extended outer shape section 10EX may be provided only beside the driver 11. Furthermore, extended outer shape sections 10EX may be provided on both sides in the Y-axis direction. In this case, the liquid crystal panel 10 may be circular or elliptical in shape as a whole. In any case, the planar shape of the display area AA, the paths along which the image signal supply wires 17 are routed, and the like are changed according to a change in the outer shape of the liquid crystal panel 10.

(20) An extended outer shape section 10EX in the liquid crystal panel 10 may include an inward-retracted circular arc (curved) portion.

(21) An extended outer shape section 10EX in the liquid crystal panel 10 may form a linear shape, a polygonal shape, or other shapes instead of a circular arc shape.

(22) The outer shape of the liquid crystal panel 10 in plan view may be a trapezoid, a diamond, a tringle, a polygon with five or more sides, or other shapes. In this case, the liquid crystal panel 10 does not need to have an extended outer shape section 10EX. For example, the outer shape of the liquid crystal panel 10 in plan view may be a trapezoid having a relatively long lower side facing the driver 11 and a relatively short upper side facing away from the driver 11. Alternatively, an end of the liquid crystal panel 10 facing away from the driver 11 or facing the driver 11 in the Y-axis direction may be formed in a partially depressed shape. In either case, the functions of the capacitance forming sections 37, 137, or 337 can be fulfilled in a configuration in which the number of pixel electrodes 19 or 319 arranged in the Y-axis direction increases or decreases according to locations in the X-axis direction. Alternatively, the liquid crystal panel 10 may have a vertically long shape when seen in plan view. The outer shape of the liquid crystal panel 10 in plan view can be changed as appropriate to a shape other than these shapes.

(23) A gate circuit section 15 may be provided only on one side of the array substrate 10A, 110A, or 310A in the X-axis direction.

(24) The specific planar shapes and numbers of pixel electrode overlap openings 20A provided in the common electrode 20, 120, 220, or 320 and common electrode overlap openings 319A provided in a pixel electrode 319 are subject to change as appropriate.

(25) The display mode of the liquid crystal panel 10 may be a TN mode, a VA mode, an IPS mode, or other modes instead of being an FFS mode.

(26) The liquid crystal panel 10 may be of a reflective type or a semitransmissive type instead of being of a transmissive type.

(27) The semiconductor film 24 may be composed of amorphous silicon or polysilicon (LTPS).

(28) The liquid crystal panel 10 may be replaced by another type of display panel (such as an organic EL (electroluminescence) display panel) or an EPD (microencapsulated electrophoretic display panel)).

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
   a plurality of pixel electrodes arranged in a row-wise direction and a column-wise direction and disposed so that the numbers of the pixel electrodes arranged in the column-wise direction vary according to locations in the row-wise direction;
   a plurality of image lines extending along the column-wise direction and supplying an image signal to the plurality of pixel electrodes arranged in the column-wise direction, the plurality of image lines being arranged in the row-wise direction and having lengths corresponding to the numbers of the pixel electrodes arranged in the column-wise direction;
   a display area in which at least the plurality of image lines and the plurality of pixel electrodes are disposed;
   a common electrode disposed in the display area to overlap the plurality of pixel electrodes via an insulating film and partially disposed in an area outside the display area;
   a common wire, disposed in the area outside the display area, that supplies a common potential signal to the common electrode;
   a plurality of image lead wires drawn from the plurality of image lines into the area outside the display area and disposed to intersect the common wire via an insulating film; and
   a plurality of capacitance forming sections connected to the plurality of image lead wires in the area outside the display area and disposed to overlap at least either the common electrode or the common wire via an insulating film; wherein
   the capacitance forming sections include a plurality of common wire capacitance forming sections joined to the plurality of image lead wires and disposed to overlap the common wire via an insulating film; and
   the common wire overlaps the common electrode in the area outside the display area.

2. The display device according to claim 1, further comprising:
   a plurality of scanning lines disposed to extend along the row-wise direction in the display area and intersect the image lines via an insulating film and arranged in the column-wise direction; and
   a plurality of scanning lead wires drawn from the scanning lines into the area outside the display area and disposed to intersect the plurality of image lead wires via an insulating film,
   wherein the capacitance forming sections include a plurality of scanning lead wire capacitance forming sections joined to at least either the plurality of image lead wires or the plurality of common wire capacitance forming sections and disposed to overlap the scanning lead wires via an insulating film.

3. A display device comprising:
   a plurality of pixel electrodes arranged in a row-wise direction and a column-wise direction and disposed so that the numbers of the pixel electrodes arranged in the column-wise direction vary according to locations in the row-wise direction;
   a plurality of image lines extending along the column-wise direction and supplying an image signal to the plurality of pixel electrodes arranged in the column-wise direction, the plurality of image lines being arranged in the row-wise direction and having lengths corresponding to the numbers of the pixel electrodes arranged in the column-wise direction;
   a display area in which at least the plurality of image lines and the plurality of pixel electrodes are disposed;
   a common electrode disposed in the display area to overlap the plurality of pixel electrodes via an insulating film and partially disposed in an area outside the display area;
   a common wire, disposed in the area outside the display area, that supplies a common potential signal to the common electrode;
   a plurality of image lead wires drawn from the plurality of image lines into the area outside the display area and disposed to intersect the common wire via an insulating film; and
   a plurality of capacitance forming sections connected to the plurality of image lead wires in the area outside the display area and disposed to overlap at least either the common electrode or the common wire via an insulating film; wherein
   the capacitance forming sections include a plurality of common electrode capacitance forming sections disposed to overlap the common electrode via an insulating film in the area outside the display area; and
   the common wire overlaps the common electrode in the area outside the display area.

4. The display device according to claim 3, wherein the capacitance forming sections include a plurality of common wire capacitance forming sections joined to the plurality of image lead wires and disposed to overlap the common wire via an insulating film, and the plurality of common electrode capacitance forming sections are connected to the plurality of common wire capacitance forming sections.

5. The display device according to claim 4, wherein the common electrode capacitance forming sections include first overlap sections disposed to overlap the common wire capacitance forming sections via an insulating film.

6. The display device according to claim 5, further comprising:

scanning lines disposed to extend along the row-wise direction in the display area and intersect the image lines via an insulating film; and scanning lead wires drawn from the scanning lines into the area outside the display area and disposed to intersect the plurality of image lead wires via an insulating film, wherein the common electrode capacitance forming sections have second overlap sections disposed to overlap the scanning lead wires via an insulating film.

7. The display device according to claim 6, further comprising:

a signal supply unit that supplies a plurality of the image signals in a time-division manner;

an image signal supply wire connected to the signal supply unit; and a switch circuit, connected to the image signal supply wire and the plurality of image lead wires, that sorts the plurality of image signals to the plurality of image lines.

8. The display device according to claim 7, wherein the switch circuit is disposed so that at least the common wire and the scanning lead wires are interposed between the switch circuit and the display area, the common electrode capacitance forming sections have third overlap sections disposed to overlap, via an insulating film, portions of the image lead wires located closer to the switch circuit than the scanning lead wires, and the common electrode has an extended common electrode section disposed to overlap the third overlap sections via an insulating film.

9. The display device according to claim 5, wherein the common electrode capacitance forming sections have extended capacitance forming sections extended to overlap the common wire but not to overlap the common wire capacitance forming sections.

10. The display device according to claim 4, wherein the common electrode capacitance forming sections include a conducting film which is identical to that which the pixel electrodes include.

11. The display device according to claim 10, wherein the plurality of image lines and the plurality of common wire capacitance forming sections are disposed at a higher layer than the common wire via an insulating film, the common electrode capacitance forming sections and the pixel electrodes are disposed at a higher layer than the plurality of image lines and the plurality of common wire capacitance forming sections via an insulating film, and the common electrode is disposed at a higher layer than the common electrode capacitance forming sections and the pixel electrodes via an insulating film.

12. The display device according to claim 10, wherein the plurality of image lines and the plurality of common wire capacitance forming sections are disposed at a higher layer than the common wire via an insulating film, the common electrode is disposed at a higher layer than the plurality of image lines and the common wire capacitance forming sections via an insulating film, and the common electrode capacitance forming sections and the pixel electrodes are disposed at a higher layer than the common electrode via an insulating film.

13. The display device according to claim 10, further comprising:

scanning lines disposed to extend along the row-wise direction in the display area and intersect the image lines via an insulating film; and scanning lead wires drawn from the scanning lines into the area outside the display area, wherein the common wire includes main wiring components constituted by a conducting film which is identical to that which the scanning lines and the scanning lead wires are constituted by and disposed to intersect the image lead wires and the common wire capacitance forming sections via an insulating film, and scanning lead wire intersections constituted by a conducting film which is identical to that which the image lead wires and the common wire capacitance forming sections are constituted by and disposed to intersect the scanning lead wires via an insulating film.

14. A display device comprising:

a plurality of pixel electrodes arranged in a row-wise direction and a column-wise direction and disposed so that the numbers of the pixel electrodes arranged in the column-wise direction vary according to locations in the row-wise direction;

a plurality of image lines extending along the column-wise direction and supplying an image signal to the plurality of pixel electrodes arranged in the column-wise direction, the plurality of image lines being arranged in the row-wise direction and having lengths corresponding to the numbers of the pixel electrodes arranged in the column-wise direction;

a display area in which at least the plurality of image lines and the plurality of pixel electrodes are disposed;

a common electrode disposed in the display area to overlap the plurality of pixel electrodes via an insulating film and partially disposed in an area outside the display area;

a common wire, disposed in the area outside the display area, that supplies a common potential signal to the common electrode;

a plurality of image lead wires drawn from the plurality of image lines into the area outside the display area and disposed to intersect the common wire via an insulating film; and a plurality of capacitance forming sections connected to the plurality of image lead wires in the area outside the display area and disposed to overlap at least either the common electrode or the common wire via an insulating film; wherein the plurality of capacitance forming sections are configured to become smaller in area of overlap with at least either the common electrode or the common wire as the image lines to which the plurality of capacitance forming sections are connected via the image lead wires become larger in length.

* * * * *